(12) United States Patent
Hopple et al.

(10) Patent No.: US 7,490,407 B2
(45) Date of Patent: *Feb. 17, 2009

(54) METHOD OF PATTERNING WALL AND PHOSPHOR WELL MATRIX UTILIZING GLASS

(75) Inventors: George B. Hopple, Palo Alto, CA (US); Roger W. Barton, Andover, MA (US); John D. Porter, Berkeley, CA (US); Theodore S. Fahlen, San Jose, CA (US); Bob L. Mackey, San Jose, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 671 days.

This patent is subject to a terminal disclaimer.

(21) Appl. No.: 11/023,995

(22) Filed: Dec. 27, 2004
(Under 37 CFR 1.47)

(65) Prior Publication Data

US 2005/0268465 A1 Dec. 8, 2005

Related U.S. Application Data

(60) Division of application No. 09/993,740, filed on Nov. 21, 2001, now Pat. No. 6,834,431, and a continuation-in-part of application No. 09/970,051, filed on Oct. 2, 2001, now Pat. No. 6,742,257.

(51) Int. Cl.
*B23P 17/00* (2006.01)

(52) U.S. Cl. .............................. 29/897; 29/458; 29/469; 29/527.1; 29/830

(58) Field of Classification Search .................. 29/897, 29/897.3, 897.312, 897.32, 423, 424, 458, 29/469, 527.1, 527.2, 527.5, 527.6, 825, 29/830; 445/23, 24; 313/238, 281, 292, 313/293
See application file for complete search history.

(56) References Cited

U.S. PATENT DOCUMENTS

| 5,371,433 | A | 12/1994 | Horne et al. |
| 5,372,973 | A | 12/1994 | Doan et al. |
| 5,445,550 | A | 8/1995 | Xie et al. |
| 5,486,126 | A | 1/1996 | Cathey et al. ................. 445/25 |
| 5,492,234 | A | 2/1996 | Fox |
| 5,589,731 | A | 12/1996 | Fahlen et al. ................ 313/495 |
| 5,650,690 | A | 7/1997 | Haven ........................ 313/422 |
| 5,704,820 | A | 1/1998 | Chandross et al. |
| 5,916,004 | A | 6/1999 | Farnworth |
| 6,288,483 | B1 | 9/2001 | Haven et al. ................ 313/461 |
| 6,486,010 | B1 | 11/2002 | Hsu |
| 6,489,718 | B1 | 12/2002 | Schmid et al. |
| 6,583,549 | B2 | 6/2003 | Takenaka et al. ............ 313/422 |
| 6,742,257 | B1* | 6/2004 | Fahlen et al. ................. 29/897 |
| 6,834,431 | B1 | 12/2004 | Hopple et al. ................ 29/897 |
| 2004/0127136 | A1* | 7/2004 | Park et al. .................... 445/24 |
| 2004/0242113 | A1* | 12/2004 | Adachi et al. ................ 445/24 |
| 2008/0122335 | A1* | 5/2008 | Liu et al. .................... 313/292 |
| 2008/0139073 | A1* | 6/2008 | Kim et al. .................... 445/24 |
| 2008/0261478 | A1* | 10/2008 | Cok et al. .................... 445/24 |

\* cited by examiner

*Primary Examiner*—Essama Omgba
(74) *Attorney, Agent, or Firm*—Ladas & Parry LLP

(57) ABSTRACT

A method of fabricating a support structure. In one embodiment, the method is comprised of forming a layer of material into the support structure. The layer of material is adapted to be attached onto a substrate surface. The method further comprises treating the layer of material. The present method is further comprised of etching said layer of material. The fabricated support structure is then implementable during assembly of a display device. In one embodiment, the support structure is attached to the substrate surface prior to the forming, treating, and etching of the layer of material. In another embodiment, the support structure is attached to the substrate surface subsequent to the forming, treating, and etching of the layer of material.

2 Claims, 29 Drawing Sheets

200

210

METHOD OF PATTERNING WALL AND PHOSPHOR WELL MATRIX UTILIZING GLASS

CROSS REFERENCE TO RELATED APPLICATION

This application is a divisional of U.S. patent application Ser. No. 09/993,740, filed Nov. 21, 2001, now U.S. Pat. No. 6,834,431 of the same title, and which is a Continuation-in-Part of U.S. patent application Ser. No. 09/970,051, filed Oct. 2, 2001, now U.S. Pat. No. 6,742,257, by Theodore S. Fahlen, et al., and entitled "A METHOD OF FORMING POWDER METAL PHOSPHOR MATRIX AND GRIPPER STRUCTURES IN WALL SUPPORT".

BACKGROUND OF THE INVENTION

1. Field of the Invention

The present invention relates to display device fabrication. More particularly, the present invention relates to the technology and fabrication of flat panel displays, e.g., field emission displays.

2. Related Art

Advancements in electronics and computer display technologies have created new categories of display devices as well as enabling improvements upon existing display technologies. New categories of display devices include FPDs, (flat panel displays), e.g., TFTs (thin film technology), LCDs (liquid crystal display), AMLCDs (active matrix liquid crystal display), and the like. Improvements upon existing display technologies such as CRTs (cathode ray tube) include greater resolution, a more diminutive dot pitch, ever increasing display screen size, and the number of recognizable colors, which has increased from monochrome (two) color to 24-bit (over 16 million) colors and higher.

However, of the display technologies mentioned above, including LCDs, not one is without certain drawbacks. For example, neither LCDs or AMLCDs can provide adequate viewing when viewed from an off-center angle, and they require backlighting which requires yet more power. TFTs are subject to immense quality control difficulties associated with each pixel's switching element, produced using integrated circuit techniques. Further, most FPDs cost substantially more than a CRT of an equivalent size. In fact, none of the FPDs or CRTs have been able to meet all of the needs for improving power consumption, increasing brightness efficiency, increased video response, improved viewing angles, cooler operating temperatures, providing full color range, scalability, ruggedness, and packaging.

In an attempt to provide a display device which responds to and overcomes the above list of needs, another class of display devices which utilize flat panel display technology has been developed. This new class of FPD (flat panel display) is called a FED (field emission display), also commonly called TCRT (thin cathode ray tube). The TCRT display is, as the name implies, a thin cathode ray tube. Accordingly, the TCRT has, on the average, a thickness of +/−8 millimeters, whereas the thickness of a conventional CRT is usually over 100 millimeters, dependent upon the size of the display.

The TCRT display has numerous other advantages over the conventional CRT, including, but not limited to, greater power efficiency, reduced operating temperature which equates to longer life for the display, reduced weight and foot print, faster response time to fast-moving graphic images, e.g., streaming video, and many others.

Even with the above mentioned improvements, the TCRT is not without certain shortcomings. For example, fabricating a TCRT requires that the back cathode side and front anode side (also called the faceplate) portions of the TCRT display be sealed together under a vacuum, which forms the tube, through which the graphic images are presented. During the application of the vacuum concurrent with the sealing process, the vacuum can result in forces as high as high fourteen and one-half pounds per square inch bearing down on the two portions being sealed. To prevent the collapse of either of the sides, cathode or anode, support structures or walls disposed interposed between the two sides are needed to prevent such an occurrence. Because of the thinness of the TCRT display being fabricated, the support structures must be strong enough to support the cathode side and anode side during the vacuum and sealing process while being thin enough so as to not adversely deflect the electron beams. Further, the support structures must be relatively easy to manufacture and cost effective, or risk having an overly expensive display product price, effectively reducing possible market share.

In one example to attempt to provide a support structure for the back cathode side and/or the front faceplate, materials having a predominantly polymer base, e.g., polyimides or polyamides were implemented. Unfortunately, polymers such as polyimides and polyamides are prone to excessive gas emissions during tube operation, such that even after outgassing, they are well known in the art to continue to generate gas within the display tube upon electron bombardment during display operation. This continual generation of gas during display operation causes a reduction of display performance and also reduces the approximated lifespan of the display device. Additionally, the polymers, (polyimides and polyamides) are very expensive, both in raw materials and in the processing costs related to the construction of the wall supports. Further, these materials have a low reflective index, which reduces the overall performance of the display, and they exhibit poor electrical conductivity.

Additionally, in many of the above mentioned attempts to provide a support structure, a photoresist is added, then exposed to the pattern of the wall support, and developed. Accordingly, a step of sandblasting, also called etching, is utilized to remove all areas of materials not covered by a photoresist. Unfortunately, current sandblasting techniques are not without drawbacks, e.g., the residue of the sandblasting is difficult to contain, it is very difficult to stop erosion at the material/substrate interface without inadvertent sandblasting of the substrate, it is slow and therefore costly, and the precision of the sandblasting is predicated upon the grit size of the sand, which is commonly around ten microns.

Thus a need exists for a support structure that provides a reduction in emitted outgasses during display operation. Furthermore, it is desirable to provide a support structure that has increased reflective properties so as to provide greater luminous efficiency. It is also desirable to provide a support structure that is less costly to manufacture. It is further desired to provide a support structure that can be etched without damaging the substrate upon which it is disposed, and it is further desired to provide a method of etching that is clean, inexpensive, and highly accurate.

SUMMARY OF THE INVENTION

Accordingly, the present invention provides a support structure that provides a reduction in emitted outgasses during display operation. The present invention further provides a support structure which achieves the above listed accomplishment and which further provides increased reflective properties so as to provide greater luminous efficiency. The present invention additionally provides a support structure that achieves the above listed accomplishments and which is less costly to manufacture. The present invention further provides a support structure that achieves the above listed accomplishments and which is etchable. The present invention further provides a support structure that achieves the above listed accomplishments and which further provides a method of etching which is clean, inexpensive, highly accurate and which does not adversely affect the substrate upon which the support structure is disposed.

The present invention provides a method of fabricating a support structure. In one embodiment, the method is comprised of forming a layer of material into the support structure. The layer of material is adapted to be attached onto a substrate surface. The method further comprises treating the layer of material. The present method is further comprised of etching said layer of material. The fabricated support structure is then implementable during assembly of a display device. In one embodiment, the support structure is attached to the substrate surface prior to the forming, treating, and etching of the layer of material. In another embodiment, the support structure is attached to the substrate surface subsequent to the forming, treating, and etching of the layer of material.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

A method of fabricating a support structure utilizable in display device assembly is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Some portions of the detailed descriptions, which follow, are presented in terms of procedures, steps, processes, and other symbolic representations of operations concurrent with and implemented during the construction of a display device. These descriptions and representations are the means used by those skilled in the display device fabrication and processing arts to most effectively convey the substance of their work to others skilled in the art. A procedure, executed step, logic block, process, etc., is here, and generally, conceived to be a self-consistent sequence of steps or instructions leading to a desired result. The steps are those requiring physical manipulations of physical quantities and which can be performed by humans and/or electronically driven machinery and apparatuses so designed and configured.

The present invention is discussed primarily in the context of a display device, or more specifically, a flat panel display such as an FED (field emitting display) also commonly referred to as a TCRT (thin cathode ray tube). However, it is appreciated that the present invention can be used with other types of display devices that have the capability to generate images in an easily recognizable manner, including, but not limited to flat panel displays.

It should be appreciated that the methods and processes discussed in the following can be applied to the cathode side of an FED as readily as upon the anode side (faceplate) of the display device. Additionally, the methods and processes can be applied to many different types of display devices, e.g., other FEDs, VFDs (vacuum fluorescent displays), electroluminescence displays, gas discharge plasma displays, and others. Accordingly, the following description of the processes and methods utilized to fabricate support structures should not be construed as limiting, but rather as exemplary so as properly depict embodiments of the present invention.

Figure 1:
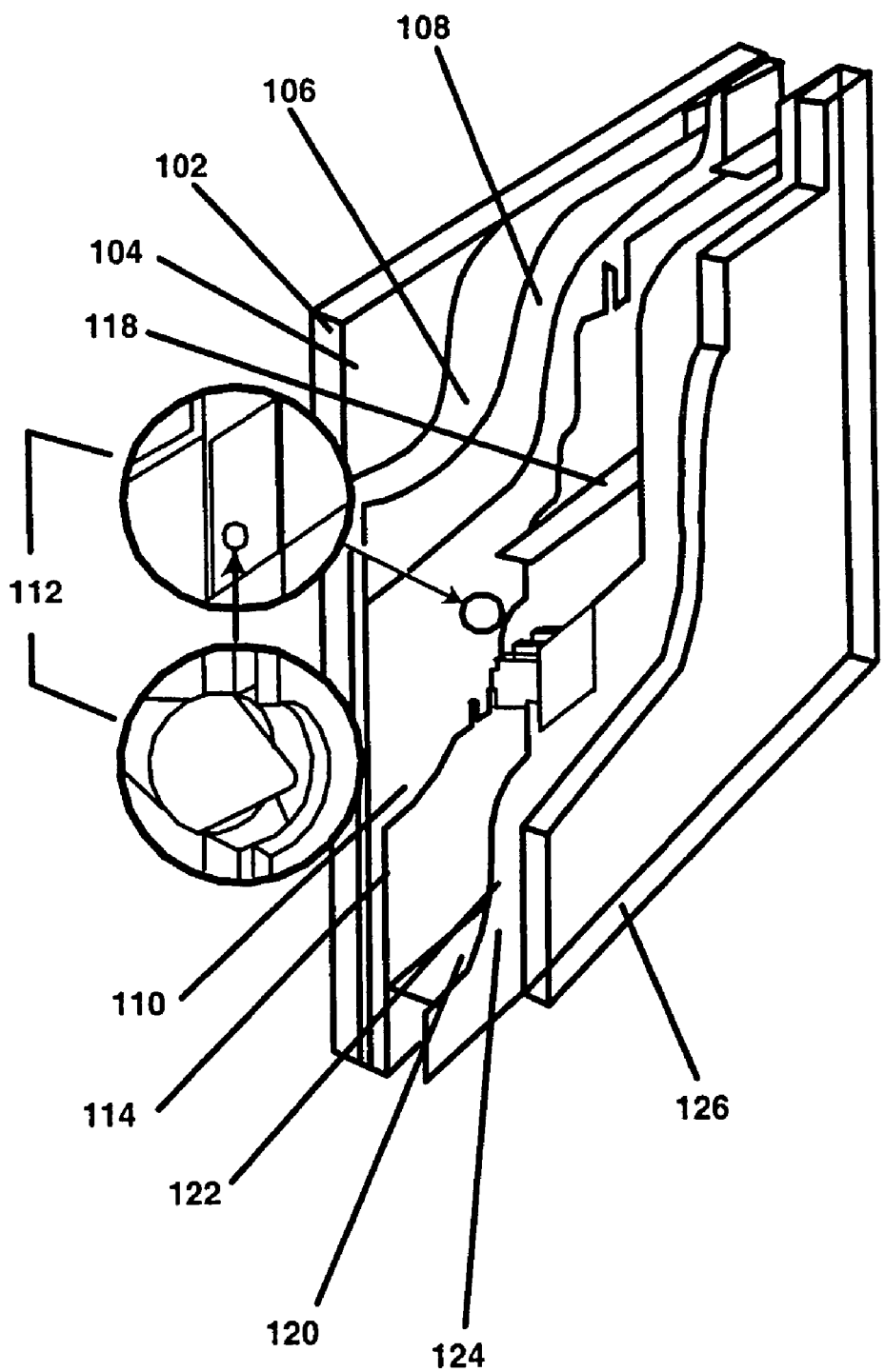
FIG. 1 is a cross-section of a display device upon which embodiments of the present invention may be practiced.

FIG. 1 is a cross-sectioned view of a display device 100, which, in one embodiment, is a FED (field emission display) upon which embodiments of the present invention may be practiced. It is appreciated that the normally present outer/protective casing of display device 100 is not shown so as to more easily describe and depict the components contained therein. In one embodiment of the present invention, display device 100 is a TCRT (thin cathode ray tube) display.

In the cross-sectioned view of display device 100 as depicted in FIG. 1, shown are the components which comprise an FED, which in one embodiment is a TCRT. Shown is glass back plate 102, the rear of the display device and is normally not viewed by a user, and onto which is disposed the cathode structure. The cathode structure consists of a combination of row metal 104, patterned resistor layer 106, dielectric 108, and column metal 110, emitter array 112, and a focusing structure 114. Also shown is faceplate 126 upon which is disposed black matrix 124, phosphor 122, and aluminum layer 120 Interposed between glass back plate 102 and faceplate 126 is support structure 118, in one embodiment of the present invention. It is appreciated that embodiments of the present invention are drawn to providing support structure 118.

Figure 2A:
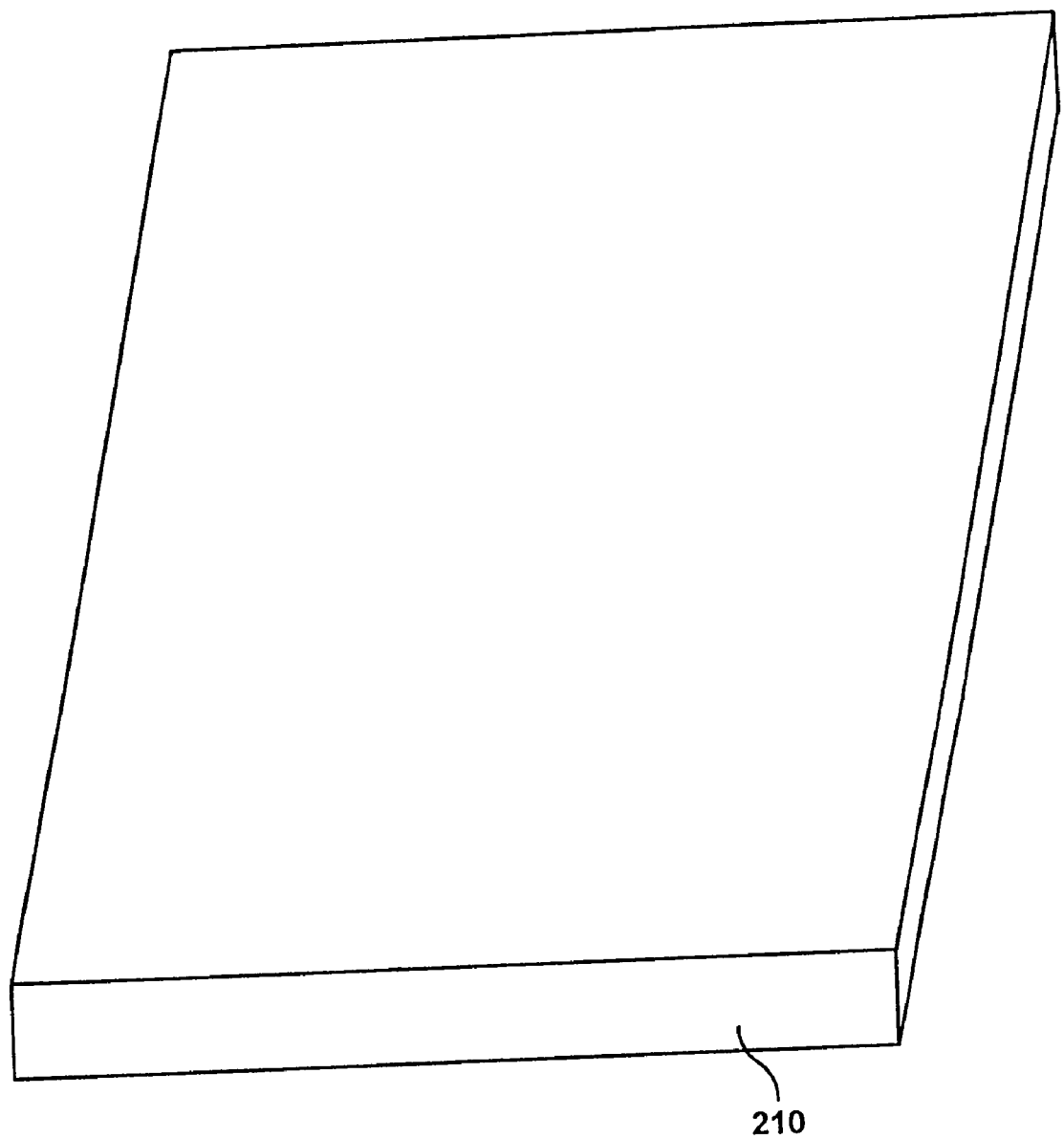
FIG. 2A is an illustration of a substrate upon which embodiments of the present invention may be disposed, in one embodiment of the present invention.

FIG. 2A shows a component 200 of the display device 100 as shown in FIG. 1. In one embodiment, component 200 is glass back plate 102, the cathode side of display device 100 of FIG. 1. In one embodiment, component 200 is faceplate 126 of display device 100 of FIG. 1. In this figure, FIG. 2A, component 200 is faceplate 126 of FIG. 1, which provides the substrate 210 upon which embodiments of the present invention can be practiced.

In one embodiment, substrate surface 210 of component 200, upon which embodiments of the present invention are disposed, is the inside surface of the faceplate. When display device 100 is sealed, the inside surface is internally disposed within the display device, and the opposing outward facing surface is that which is facing a user.

Figure 2B:
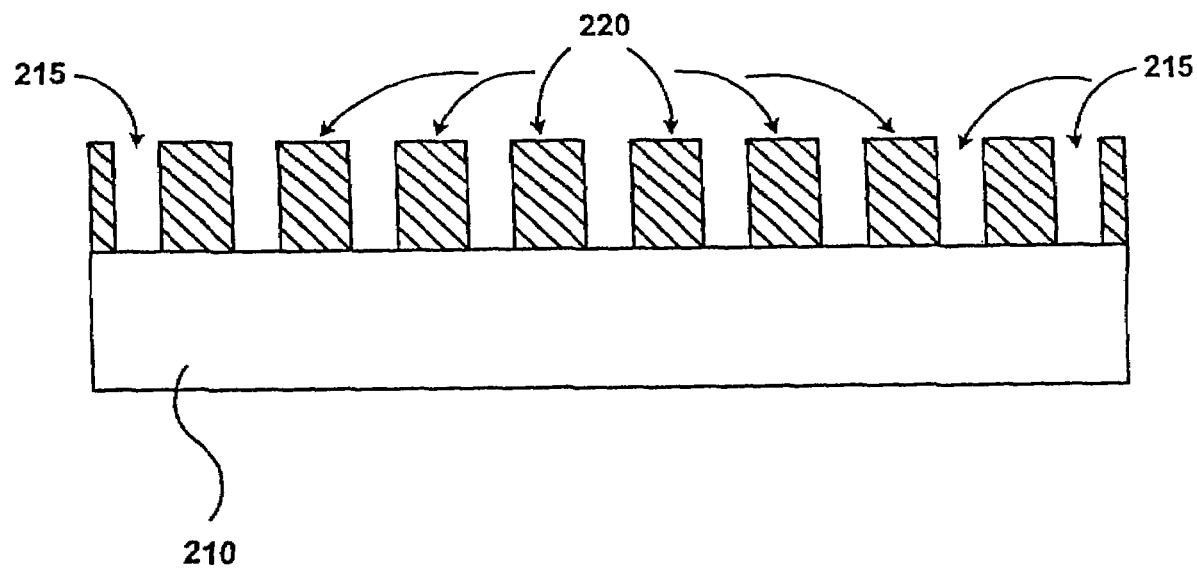
FIG. 2B is an illustration of the substrate of FIG. 2A with a mold disposed thereon for forming a support structure disposed thereon, in one embodiment of the present invention.

FIG. 2B shows substrate 210 having a photoresist mold 220, as indicated by horizontal lines, disposed thereon, in one embodiment of the present invention. Photoresist mold 220 defines the physical dimensions of the support structure being fabricated. Photoresist mold 220 is a patterned negative image of that support structure being fabricated. In one embodiment, photoresist mold 220 comprises trenches 215 having a width ranging from approximately ten to forty microns and a height ranging from approximately twenty to eighty microns. The dimensional tolerances of trenches 215 is typically +/−five microns, in one embodiment of the present embodiment.

Figure 2C:
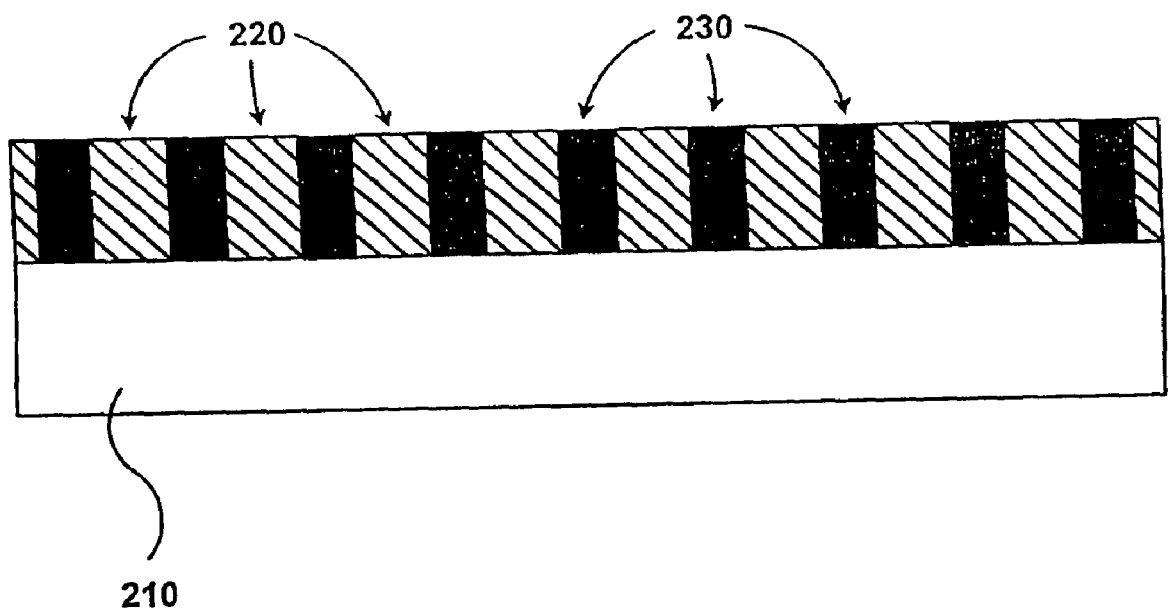
FIG. 2C is an illustration of the substrate of FIG. 2B depicting the mold filled with a material used in the support structure, in one embodiment of the present invention.

FIG. 2C shows a powder metal 230 having been deposited into photoresist mold 220 of substrate 210, in one embodiment of the present invention. In one embodiment, powder metal 230 is a getterable material, e.g., zirconium or one that is titanium based. In one embodiment, a low CTE (coefficient of thermal expansion) filler is incorporated into powder metal 230 to provide a CTE match with substrate 210 upon which it is disposed. In this embodiment, powder metal 230 is a dry powder metal and is subject to dimensional variations until a compacting and sintering process is performed thereon.

Still referring to FIG. 2C, subsequent to depositing powder metal 230 into trenches 215 of mold 220, powder metal 230 is compacted. In one embodiment, compaction of powder metal 230 is by conventional vibration and (thermal) sintering. In another embodiment, microwave sintering is combined with the convention vibration to compact powder metal. In another embodiment, ultrasonic processes are combined with thermal sintering, either conventional or microwave, to provide compaction. It is appreciated that the temperature used to provide sintering does not reach the melting point of powder metal 230.

Figure 2D:
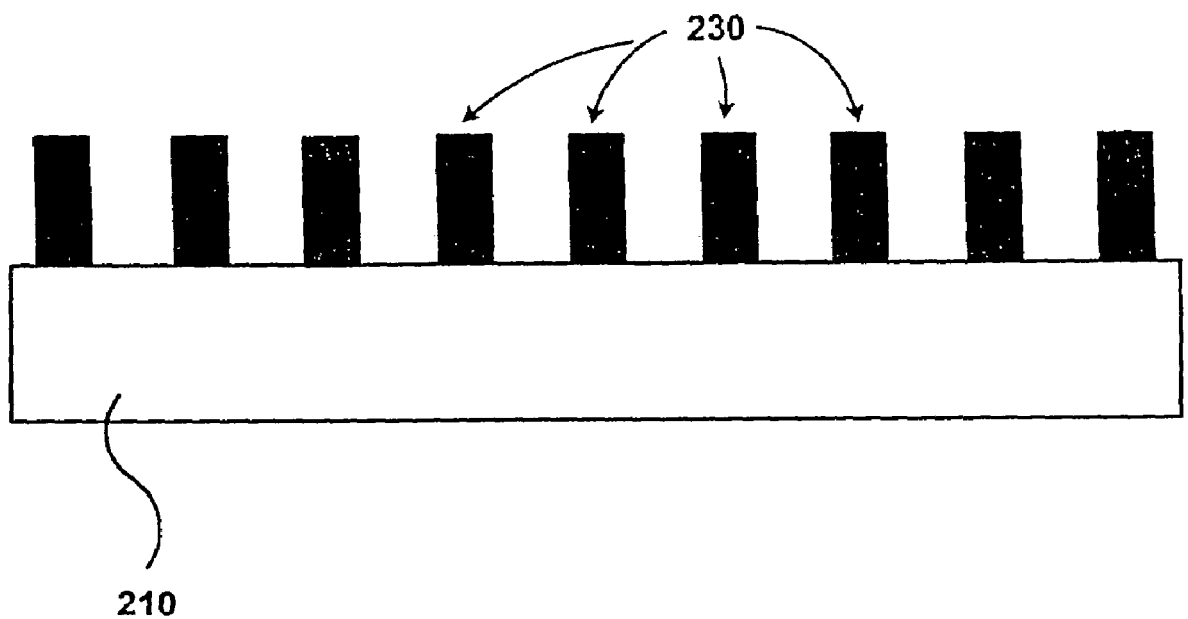
FIG. 2D is an illustration of the substrate of FIG. 2C depicting the remaining material, now formed as the support structure, subsequent to the removal of the mold, in one embodiment of the present invention.

Referring to FIG. 2D, shown is powder metal 230 as the fabricated wall supports, subsequent to a) the compaction and sintering process applied thereto, as described in FIG. 2C, and b) the removal of photoresist mold 220, in one embodiment of the present invention. In one embodiment, polishing of powder metal 230 may be performed prior to the removal of photoresist mold 220. In another embodiment, polishing of powder metal 230 may be performed after removal of photoresist mold, 220. The removal of photoresist mold 220, can, in one embodiment, be accomplished by dissolution. In another embodiment, the removal of photoresist mold is by thermal burn-out.

Figure 2E:
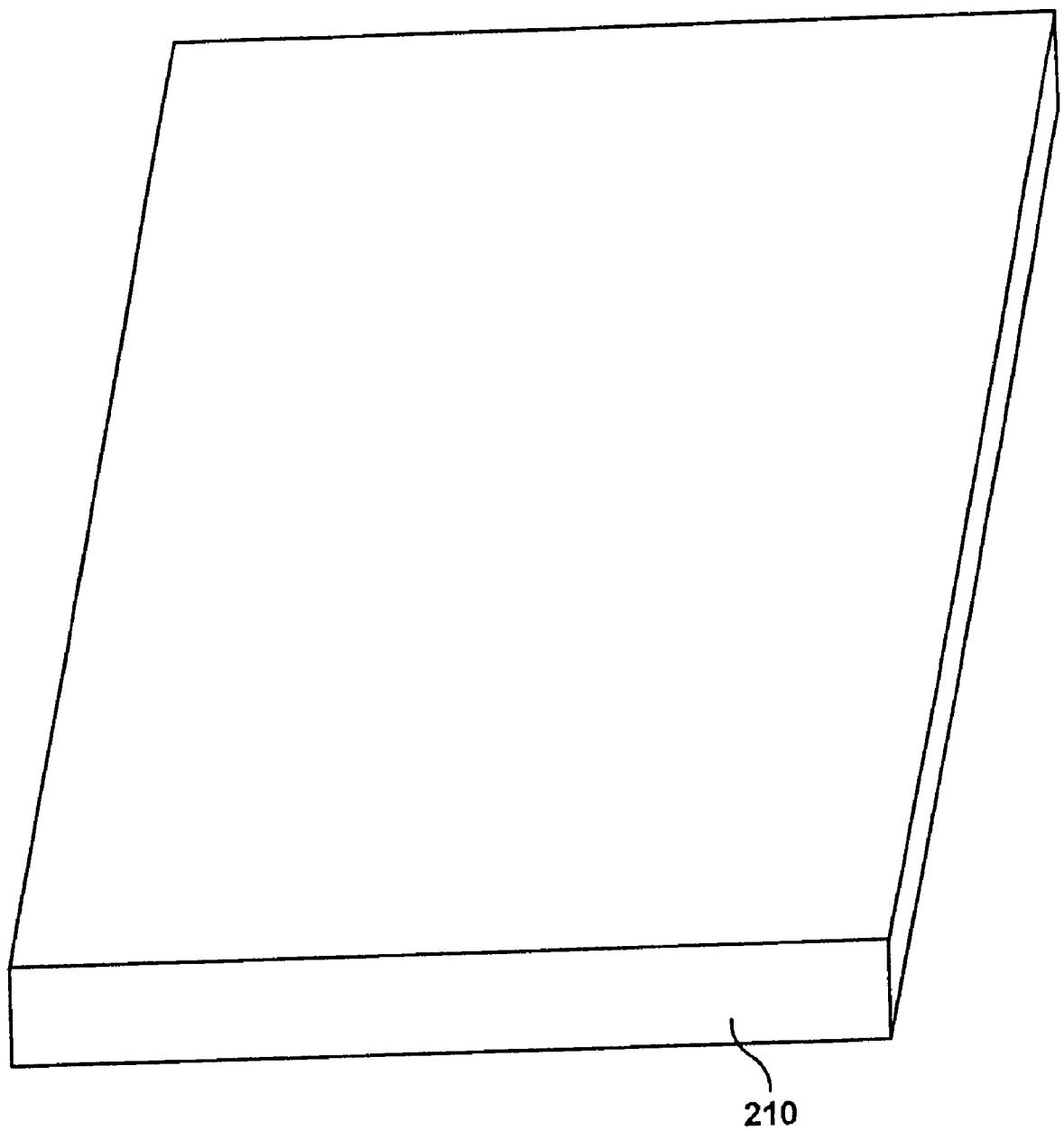
FIG. 2E is an illustration of a substrate upon which embodiments of the present invention can be practiced, in another embodiment of the present invention.

FIG. 2E shows substrate 210, prior to disposition of a photoresist mold 220 thereon, in another embodiment of the present invention. It is appreciated that substrate 210 of FIG. 2E is analogous to substrate 210 of FIG. 2A.

Figure 2F:
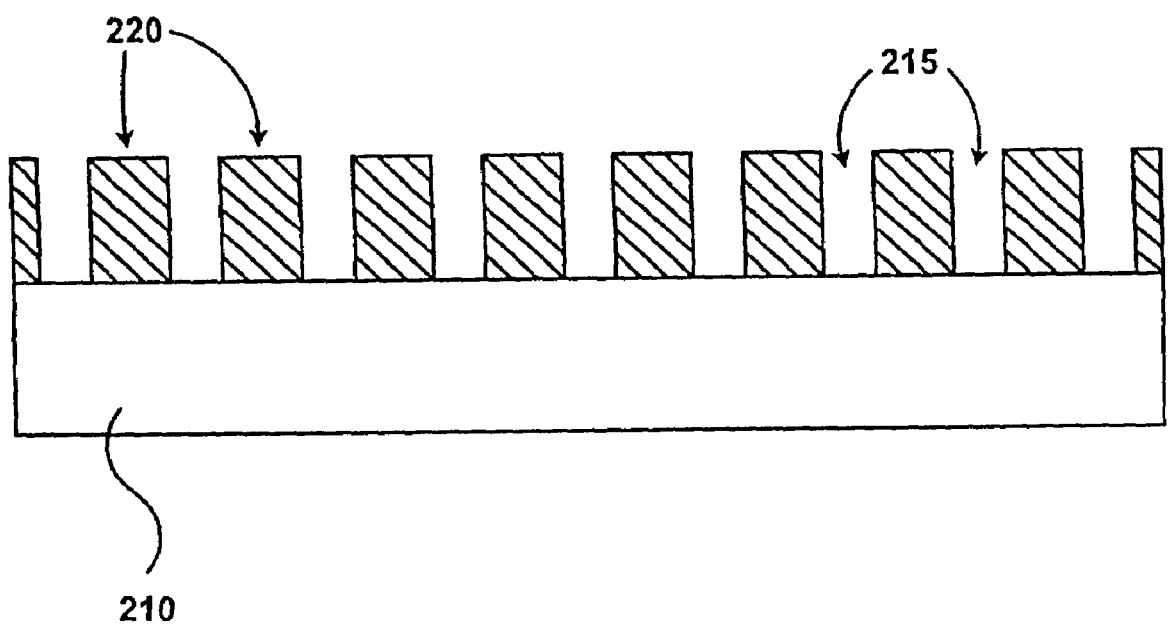
FIG. 2F is an illustration of the substrate of FIG. 2E with a mold disposed thereon for forming a support structure disposed thereon, in one embodiment of the present invention.

FIG. 2F shows substrate 210 having a photoresist mold 220, as indicated by horizontal lines, disposed thereon, in one embodiment of the present invention, and it is appreciated that substrate 210 and mold 220 of FIG. 2F are analogous to substrate 210 and photoresist 220 of FIG. 2B.

Figure 2G:
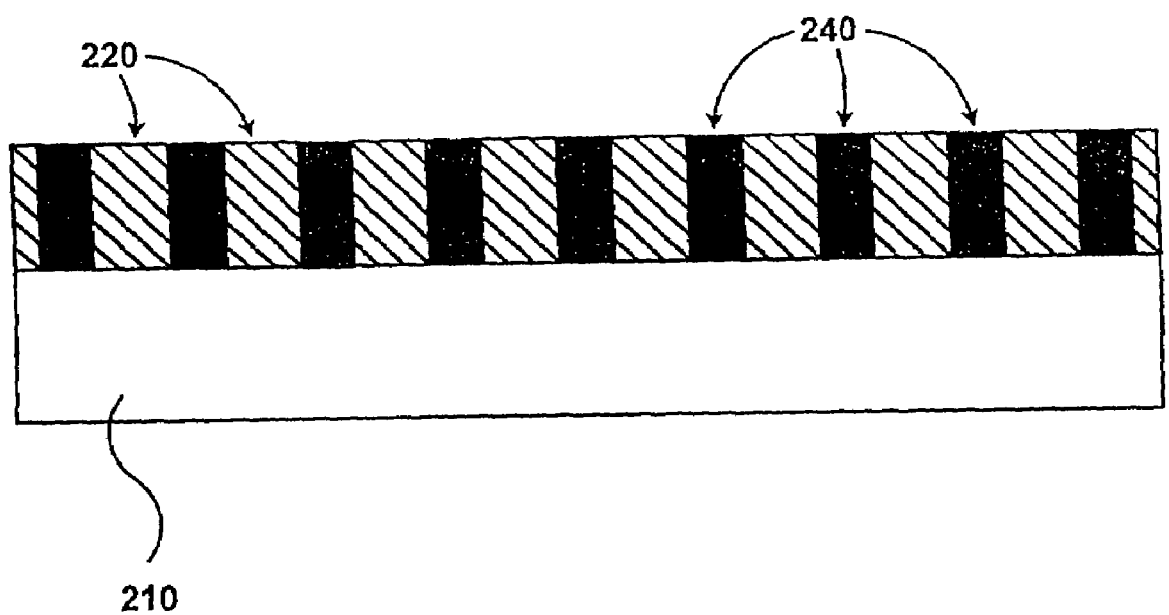
FIG. 2G is an illustration of the substrate and mold of FIG. 2F with the mold filled with a material used in forming a support structure, in one embodiment of the present invention.

FIG. 2G shows a powder metal paste 240 having been deposited into photoresist mold 220 of substrate 210, in one embodiment of the present invention. In the present embodiment, powder metal paste 240 comprises a powder metal which is combined with a wax into a metal paste. In another embodiment, powder metal paste 240 comprises a powder metal which is combined with a polymer-based binder into a metal paste. The physical properties of powder metal paste 240 are such that it has low viscosity, enabling gap-free (voidless) trench filling. Powder metal paste 240, in this embodiment, is then pressed into trenches 215. In one example, a squeegee is utilized to press metal paste 240 into trenches 215. In another example, a doctor blade can be utilized to press metal paste 240 into trenches 215. It should be appreciated that numerous other implements can be utilized to press metal paste 240 into trench 215, and, as such, those listed above should not be considered limiting, but rather as exemplary.

Still referring to FIG. 2G, and after the pressing of powder metal paste 240 into trenches 215 of mold 220, powder metal paste 240 is dried, in one embodiment of the present invention. In one embodiment, the drying of powder metal paste 240 is accomplished at temperatures ranging from fifty to one hundred fifty degrees Celsius. This causes the binder to solidify, thereby maintaining the desired shape and dimensions, even if subjected to an optional solvent dissolution of photoresist mold 220. Once dried, powder metal paste 240 is then heated to temperatures ranging from three hundred and fifty degrees to five hundred and fifty degrees Celsius to accomplish sintering and binder burn-out, with an optional concurrent photoresist mold 220 burn-out being accomplished during the same thermal cycle, in one embodiment.

It is appreciated that in one embodiment, the sintering of powder metal paste 240 is performed as a separate step prior to the binder burn-out. This embodiment has the advantage of preventing shrinking or deformation of the support structures which can occur at elevated temperatures after the binder is removed. In one embodiment, a two stage thermal cycle is performed. In the first step, the sintering is performed in a vacuum or inert atmosphere. The second step is performed in an air or oxygen atmosphere to encourage binder burn-out.

It is further appreciated that in one embodiment, complete densification of powder metal paste 240 is not required during the sintering cycle, such that a structure having somewhat porous properties can provide advantages regarding retentive properties, particularly when the gripper material is used for its vacuum gettering capabilities.

Figure 2H:
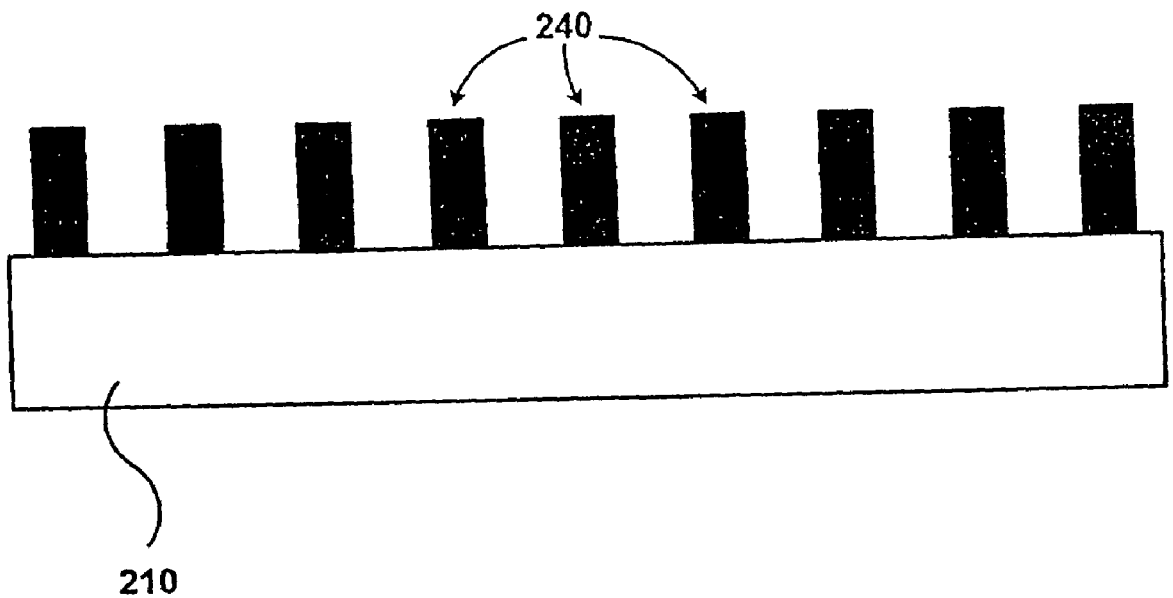
FIG. 2H is an illustration of the substrate of FIG. 2E depicting the remaining material, now formed as the support structure, subsequent to the removal of the mold, in one embodiment of the present invention.

Referring now to FIG. 2H, shown are the remaining wall support (gripper) structures fabricated out of powder metal paste 240, subsequent to binder burn-out, and in one embodiment, burn-out of photoresist mold 220.

It is appreciated, in the present embodiment, that because the wall supports are fabricated utilizing a powder metal, the fabricated metal wall supports provide reduced out-gassing and greater conductivity. Additionally, the metal wall supports provide a higher degree of reflectivity than previously used materials. Further, in another embodiment, the metal wall supports can provide a more secure metal wall attachment scheme.

It is further appreciated that to ensure the success of the powder metal paste technique described above, the design and composition of the particles in the powder metal and the binder material utilized in powder metal paste 240 are critical.

For example, in one embodiment, the use of particles that are less that twenty microns, and preferable less than five microns in diameter are desired to achieve accurate replication of the photoresist mold. In one embodiment, a high loading or concentration of the particles, ranging from fifty to eighty percent, is used to retard tendencies of the powder metal paste to shrink during the sintering process.

It is appreciated that the principles of eutectics can be utilized in the reduction of required temperatures associated with processes in the fabrication of the support structures. In one embodiment, drawn to providing CTE matching, the powder metal particles includes a mixture of two components. One component is the sintering agent, which accomplishes the goal of effecting sintering at temperatures below five hundred and fifty degrees Celsius. The second component is the filling agent, which accomplishes the goal of enabling the powder metal paste to be adjusted so that the CTE (co-efficient of thermal expansion) of the powder metal paste is compatible with the substrate upon which it is disposed, and to prevent shrinkage of the powder metal paste during sintering.

In one embodiment, drawn to providing a lowering of the sintering temperature, it is desirable to a) utilize metal particles which are easily sintered in the temperature range of three hundred and fifty to five hundred and fifty degrees Celsius. This is accomplished by the incorporation of low melting point alloying elements, e.g., Mg (magnesium), Cd (cadmium), Zn (zinc), Sn (tin), Cu (copper), Ag (silver), nearly any element used in brass or bronze alloys, bronze brazing alloys or solders; b) utilize smaller particle sizes, e.g., in the range of 0.1 to 5.0 microns; c) use of irregularly shaped and/or distorted particles, such as those from a ball mill.

In addition, metal particles that are effective as gettering agents can be beneficial when combined with the other elements. In one embodiment, these particles should contain elements, e.g., Ba (barium), Zr (zirconium), Mg (magnesium), Ti (titanium), Cs (cesium) and those elements classified as Lanthanides, such as Pr (praseodymium), Sm (samarium), and the like.

Further, in one embodiment, it is also desirable to utilize a binder that encourages particle dispersion, resists flocculation (particle clumping), and reduces viscosity during the filling process. Additionally, the binder material should comprise physical properties which prevents distortion and premature burn-out at temperatures up to three hundred and fifty degrees Celsius, but is effectively and completely burned out at temperatures below five hundred and fifty degrees Celsius. High temperature, cross-linked polyimides or polyamide or polyvinyl butylate or polyvinyl acrylate compounds are some of the materials that are incorporatable in the powder metal paste.

Figure 2J:
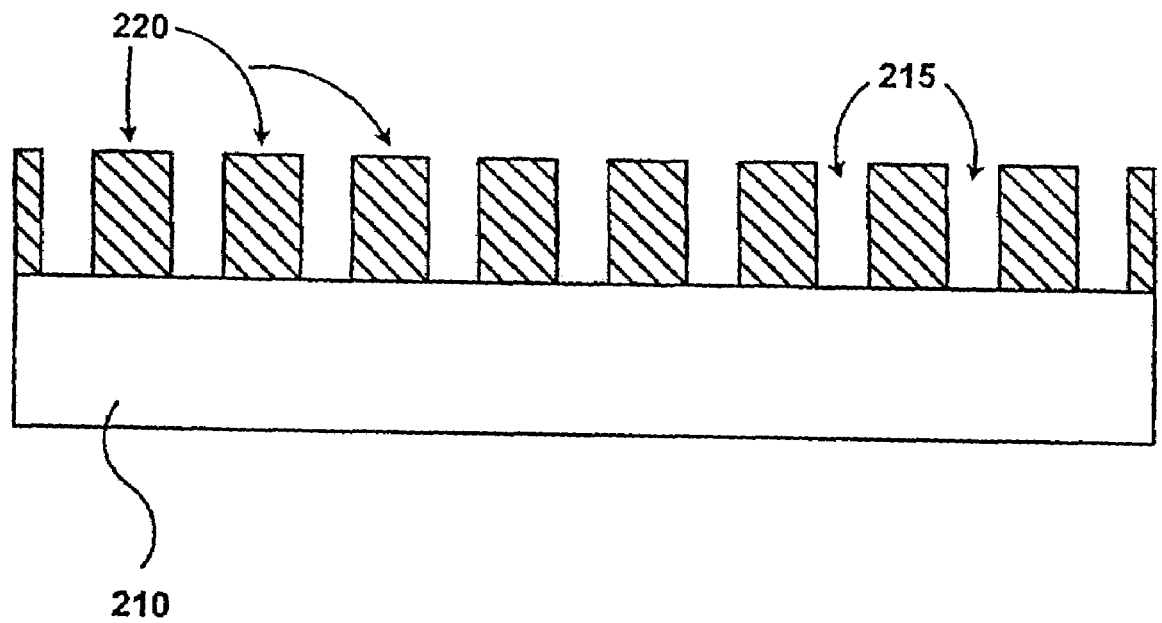
FIG. 2J is an illustration of the substrate of FIG. 2E with a mold disposed thereon for forming a support structure disposed thereon, in another embodiment of the present invention.
Figure 2K:
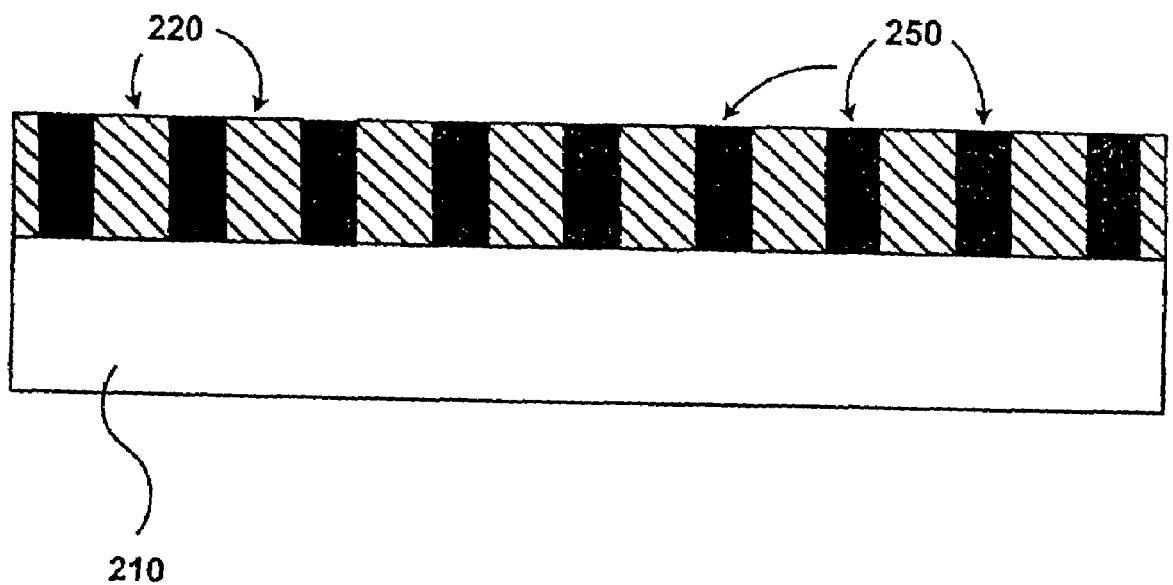
FIG. 2K is an illustration of the substrate and mold of FIG. 2J with the mold filled with a material used in forming a support structure, in one embodiment of the present invention.
Figure 2L:
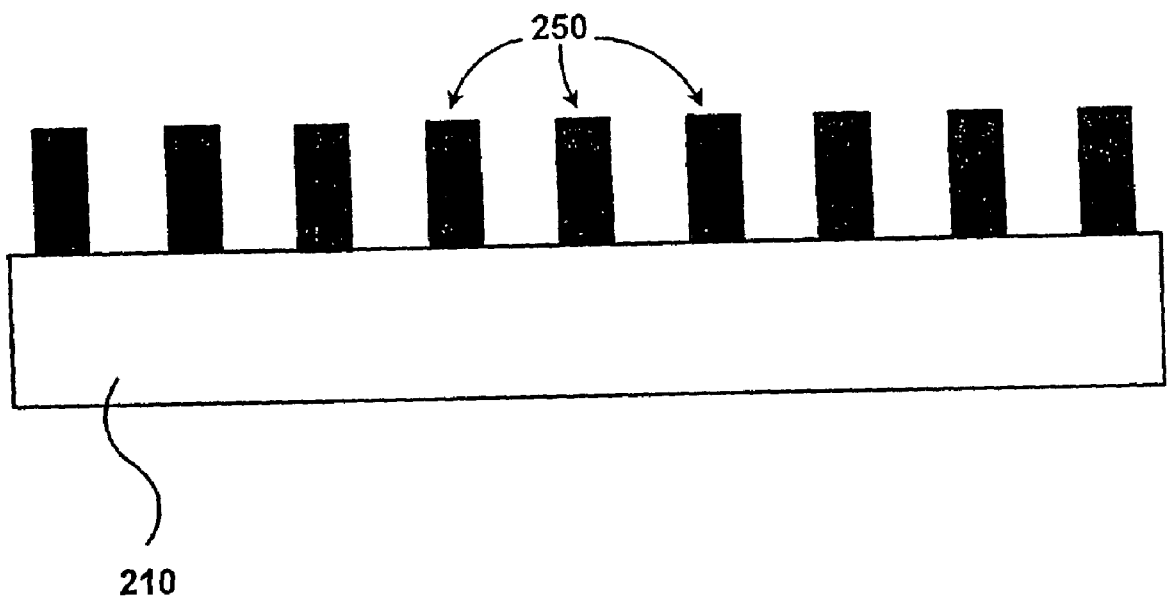
FIG. 2L is an illustration of the substrate of FIG. 2G depicting the remaining material, now formed as a support structure, subsequent to the removal of the mold, in one embodiment of the present invention.

Referring now to FIG. 2J, shown is substrate 210, analogous to substrate 210, with a photoresist mold 220 disposed thereon, in one embodiment of the present invention. In the present embodiment, a particle jet is produced so that mold 220 may be filled with metal 250 without nearly any need for large amounts of binder compounds. In one embodiment, the particles comprising metal 250 can be sprayed directly into the mold and caused to sinter at modest temperatures before the mold itself is burned-out. This reduces the amount of volatile organics that are incorporated within metal 250 itself and potentially reduce shrinkage upon burnout of mold 220. In this embodiment, a spray gun it utilized to deposit metal 250 in mold 220, replacing the paste and doctor blade or squeegee technique described in FIGS. 2F, 2G, and 2H, above. As the particles are fluidized in a gas jet, they are better able to flow into and fill the narrow and deep trenches 215 of mold 220 without needing additional pressure from a doctor blade.

While a large number of powder spray techniques are available, most of these have been adopted for use in the paint industry where the powders are generally polymer materials and easily fused together after impacting the working surface. The spray guns often use electrostatic charging to enhance the acceleration of the particles, thereby reducing the need to use high gas pressure in projecting the particles.

It is appreciated that the spray guns to be utilized in the deposition of metal 250, in this embodiment, are distinctly different from those described above in that the particles are not melted when impacting mold 220. A colder method of particle application is used to remove the possibility of melting or distorting photoresist mold 220 during spray-on deposition of metal 250.

A distinction can also be made between powder spray, such as those used in the paint industry, and kinetic spray which has been developed in the powder metal industry. Kinetic spray is designed to project the particles in a supersonic gas flow to increase the impact energy against a substrate, e.g., substrate 210 of FIG. 2J. In this way the particles can be consolidated without the need for prior melting. For the gripper application, however, complete densification of the powders is not necessary, and may not be desirable if there is a risk of deforming photoresist mold 220 in the process.

In one embodiment, a lower velocity powder spray can be implemented. The lower velocity spray can include one or more of the following characteristics. In one embodiment, consolidation of metal 250 is performed in comparison to densification. A consolidated sprayed-on wall support structure 250 is sometimes referred to as a brown body, meaning that it is a partially sintered material from which the binders have been previously burned-out. In this embodiment, the energy of the spray need only have enough velocity to bind the particles within mold 220 so that the support structure 250 will not lose its shape and dimension before a final sintering or strengthening process at higher temperatures. In one embodiment, ultrasonic compaction may also be utilized to promote binding without heating, thereby improving the strength of the support structure 250 (brown body) while it is still in mold 220.

In one embodiment, the powders can be formulated using relatively low melting point materials, e.g., from the elements listed above in describing FIGS. 2F, 2G, and 2H, so that relatively less kinetic energy is required to fuse them on impact with the surface. For example, copper and silver are but two of the low melting materials that will easily stick together upon impact.

It is appreciated that, in one embodiment, the particles can be made small, e.g., less than one micron, so as to reduce the energy necessary for effective fusion or interparticle binding. Additionally, a modest amount of organic volatilized binder can be incorporated in the spray to enhance cohesion of the brown body. In one embodiment, by volume percent, this binder can comprise up to ten percent of the support structure 250 as opposed to thirty percent or more which is typical in paste applications.

While the above embodiment describes a spray process which does not utilize additional heat being incorporated therein, in another embodiment a heated spray can assist in the consolidation process.

In one embodiment, a two component spray can be implemented to assist with consolidation. The two component spray is comprised of one metal component which is sprayed at a temperature close to its melting point, (the sintering agent) and the other metal component, of a higher melting point, can be implemented as a filler compound.

In another embodiment, a multi-stage spray process may be implemented. In this embodiment, as a first part of the process, a first layer would be spray deposited into mold 220 disposed on substrate 210, which would be followed by a first polishing. Subsequent to completion of the first step, a second layer is spray deposited, followed by a second polishing process.

In another embodiment, a polishing process can be performed on the deposited material to precisely adjust the planarity and height of the deposited material.

It is appreciated that in one embodiment of the present invention, because the support structure is fabricated out of metal and is black in color, the steps associated with fabricating a black matrix, e.g., black matrix 124 of FIG. 1 and the steps associated with fabricating an aluminum layer, e.g., aluminum layer 120 of FIG. 1 are eliminated. In another embodiment, the black matrix and aluminum layer are fabricated in conjunction with the fabrication of the support structures interposed between the faceplate and the cathode.

Figure 3A:
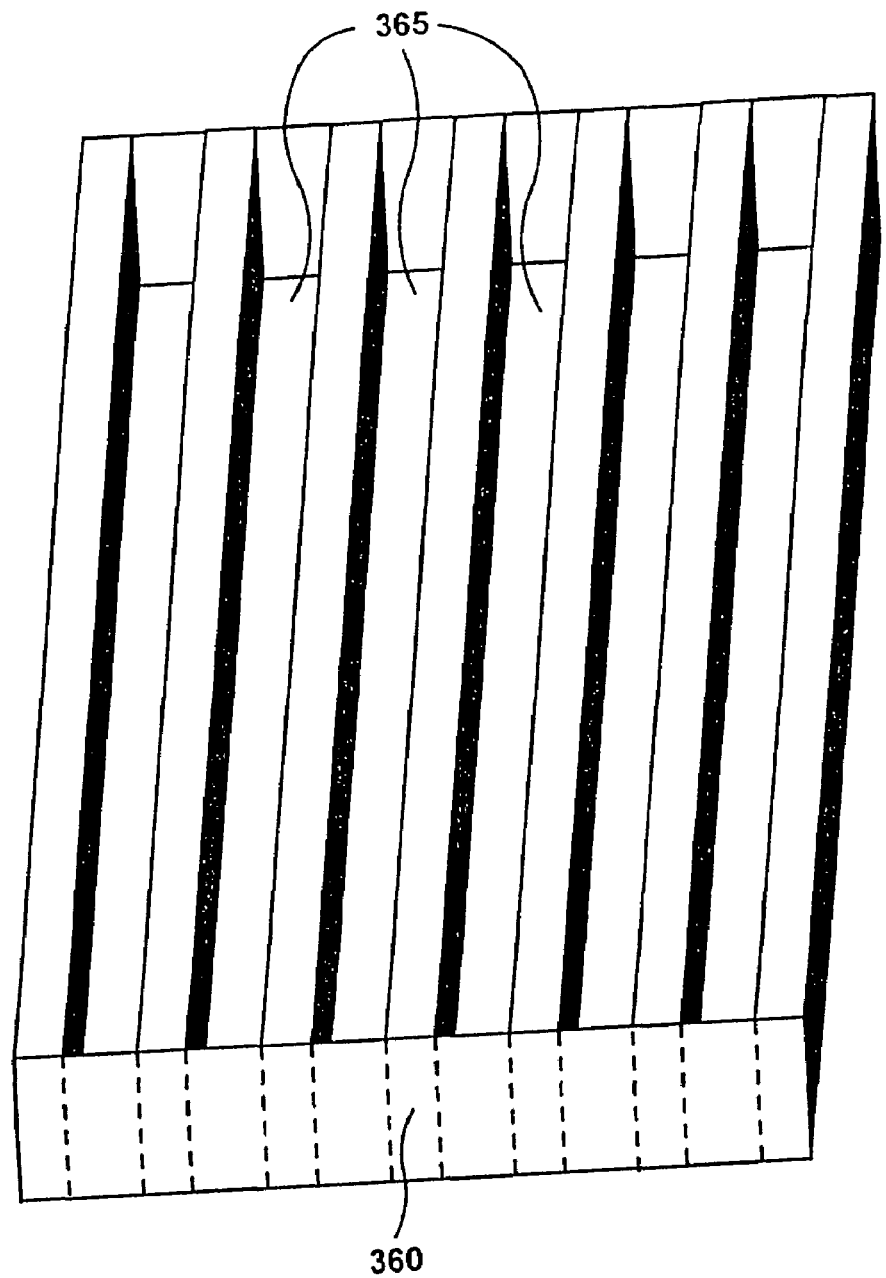
FIG. 3A is an illustration of metal frame blank for molding wall positions, into which a metal strip is stamped and formed, in one embodiment of the present invention.
Figure 3B:
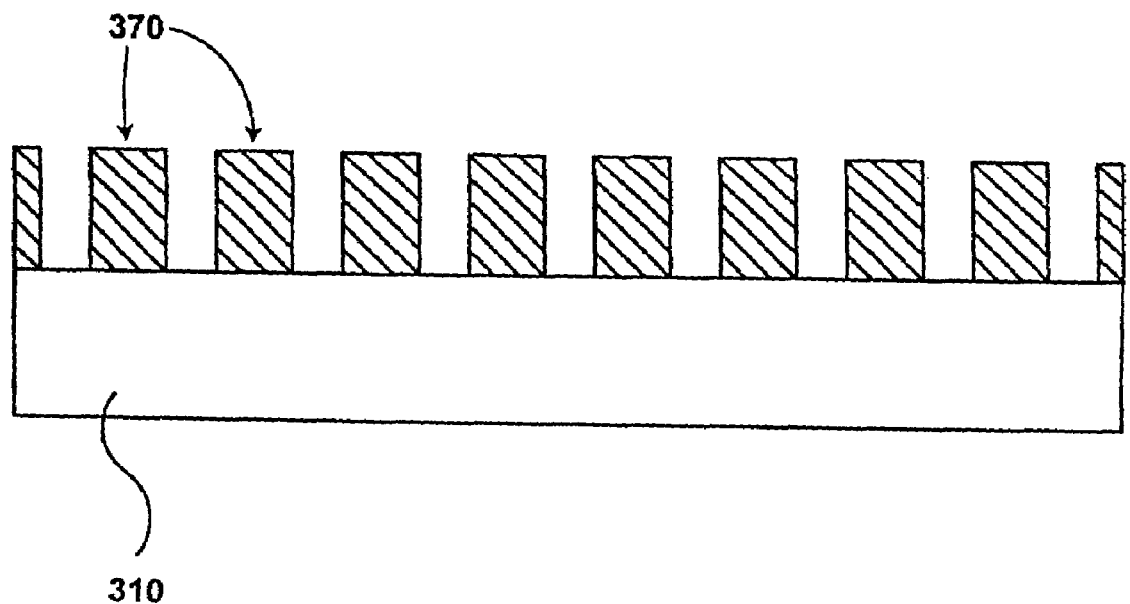
FIG. 3B is an illustration of the substrate of FIG. 2A upon which a stamped and formed metal strip is disposed, in one embodiment of the present invention.

Referring now to FIG. 3A, shown is metal frame blank 360 into which metal is placed, stamped, and formed, in one embodiment of the present invention. Once stamped and formed, metal strip 370, shown in FIG. 3B, is then disposed upon a substrate 310 shown in FIG. 3B (analogous to substrate 210 of FIG. 2A). The metal is deposited in troughs 365 which define the physical dimensions of the metal strip being fabricated. In this embodiment, the metal strip is used to provide a negative image of the wall support structure being fabricated.

Referring to FIG. 3B, shown is the stamped and formed metal strip 370 (as indicated by diagonal lines) disposed upon substrate 310, in one embodiment of the present invention.

Figure 3C:
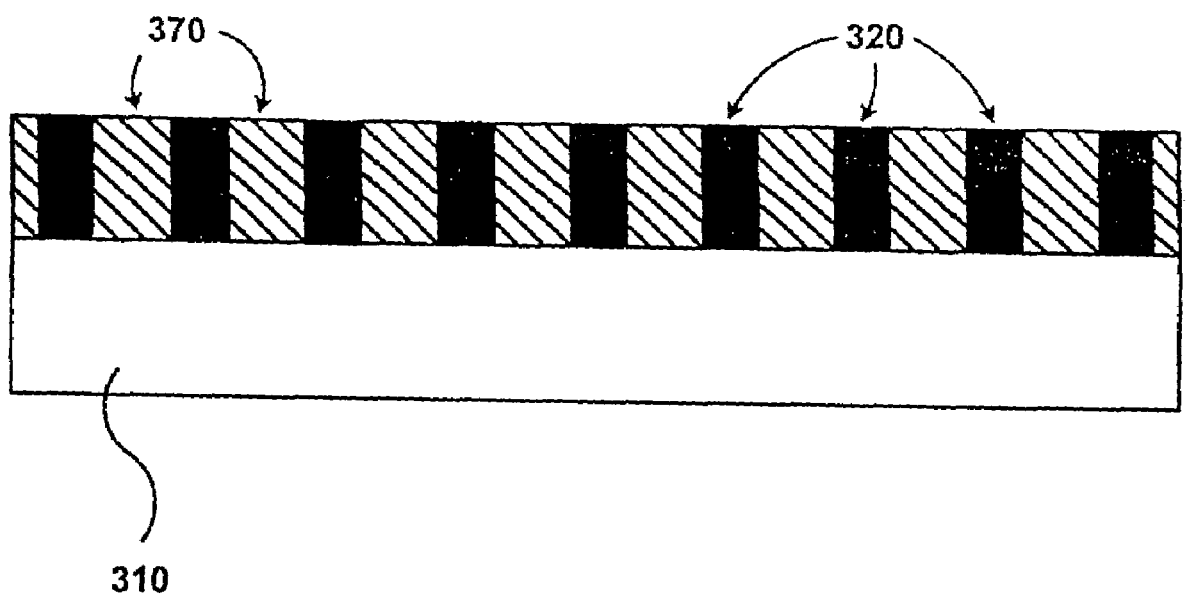
FIG. 3C is an illustration of a covering having been applied to the metal strip and substrate of FIG. 3B, in one embodiment of the present invention.

Referring to FIG. 3C, subsequent to the disposition of metal strip 370 on substrate 310, a glaze 320 is applied to both substrate 310 and metal strip 370, in one embodiment of the present invention. Subsequent to the application of glaze 320, in one embodiment, increased temperature is applied to the assembly (metal strip 370 and substrate 310) so as to reflow the glaze, such that metal frame 370 is encapsulated by the glaze.

Figure 3D:
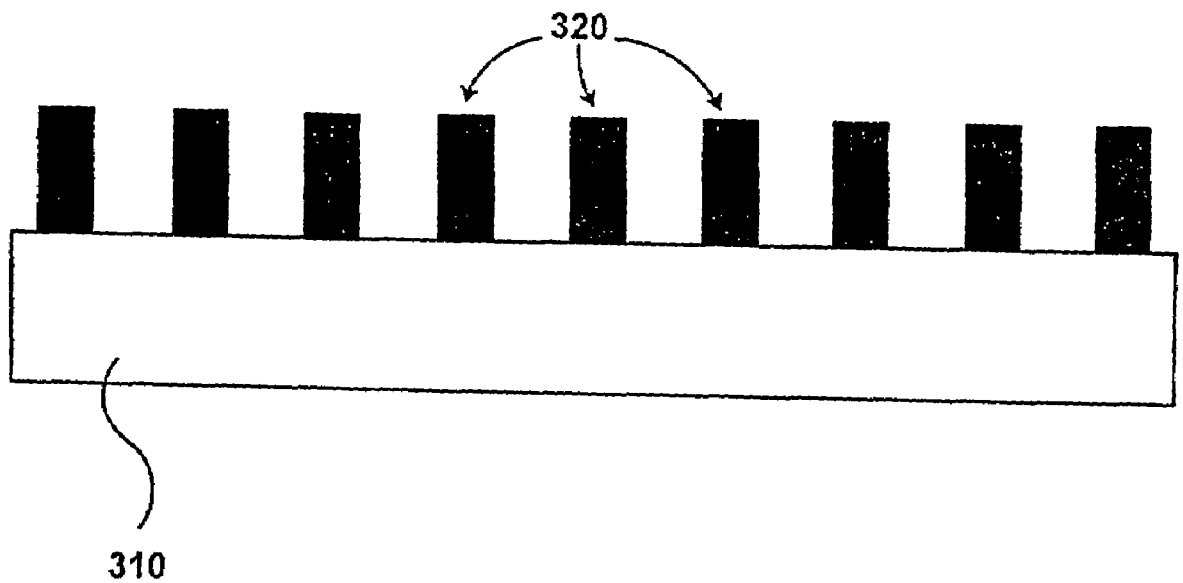
FIG. 3D is an illustration of the covering, which remains after the metal strip has been etched away, in one embodiment of the present invention.

Referring to FIG. 3D, subsequent to the reflowing of glaze 320, metal strip 370 is removed, such that glaze 320 remains, forming the wall support structure being fabricated. In one embodiment, the removal of metal strip 370 is by etching. The etching process simultaneously provides retentive indentations (vertical grooves) in glaze 320, which provides for more secure wall confinement. In one embodiment, glaze 320, as the wall support structure, can then be patterned and etched to form the black matrix for phosphor. In another embodiment, glaze 320 can be formulated to function as contrast filter, and as such would not be subjected to patterning and etching. Subsequently, conventional processes are utilized to form black matrix and phosphor.

It is appreciated, in one embodiment, that because the wall support structure are fabricated out of a ceramic glaze, a reduction of out-gassing from electrodesorbtion is realized. Further, the reduction in out-gassing provides for greater display performance and increases the life of the display.

In one embodiment of the present invention, it is appreciated that the fabrication of a black matrix, e.g., black matrix 124 of FIG. 1, and the fabrication of an aluminum layer, e.g., aluminum layer 122 of FIG. 1, is performed in conjunction with the fabrication of the support structures as described in FIGS. 3A to 3D.

Figure 4A:
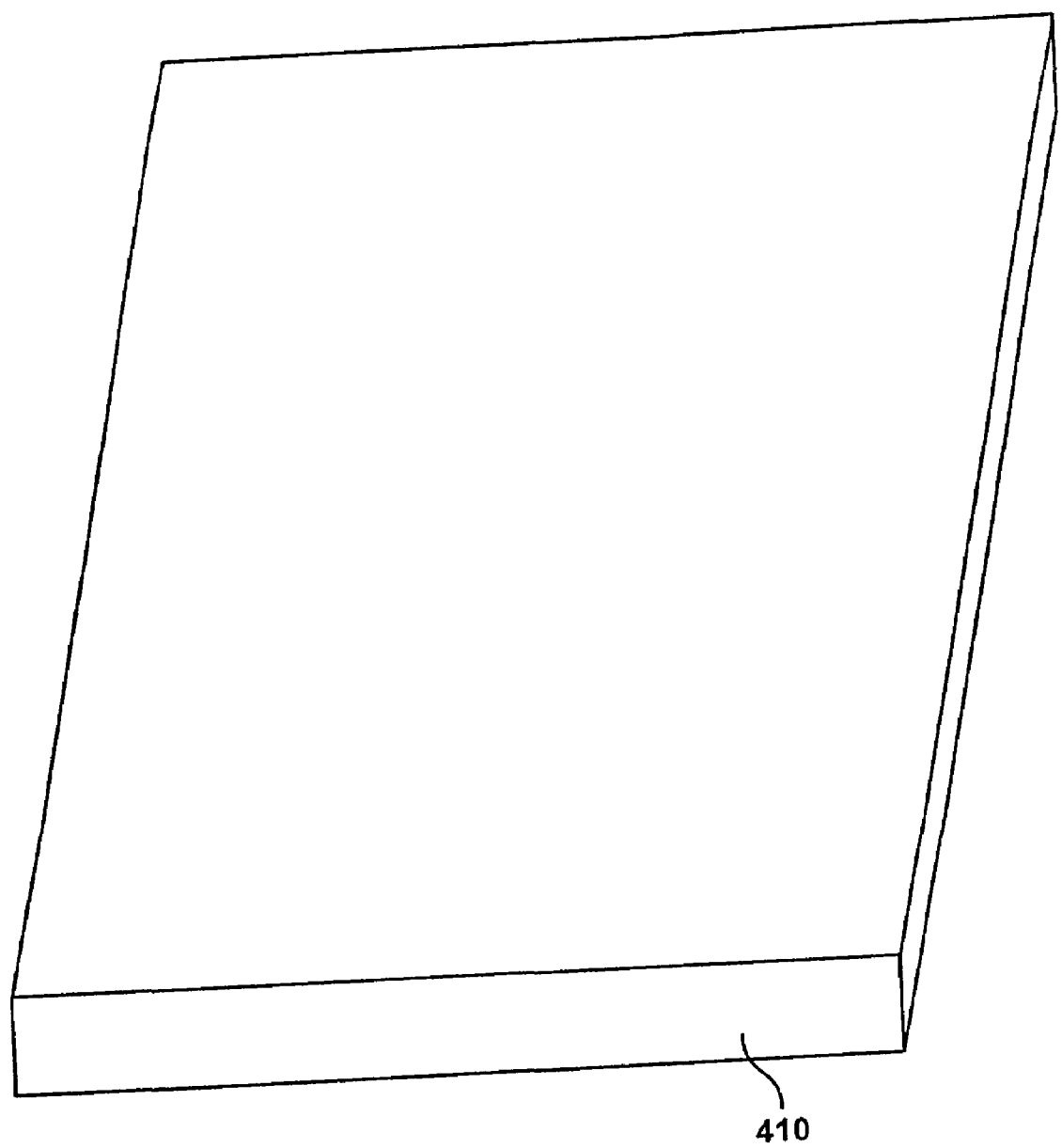
FIG. 4A is an illustration of the substrate of FIG. 2A upon which further embodiments of the present invention may be practiced.

In another method to fabricate support structures, glass, in a continuous or sheet form, is utilized in the fabrication process. FIG. 4A is an illustration of substrate 410 upon which embodiments of the present invention may be practiced. Substrate 410 is analogous to substrate 210 of FIG. 2A. In one embodiment, substrate 410 is D263 glass. In another embodiment, substrate 410 is an alternative glass.

Figure 4B:
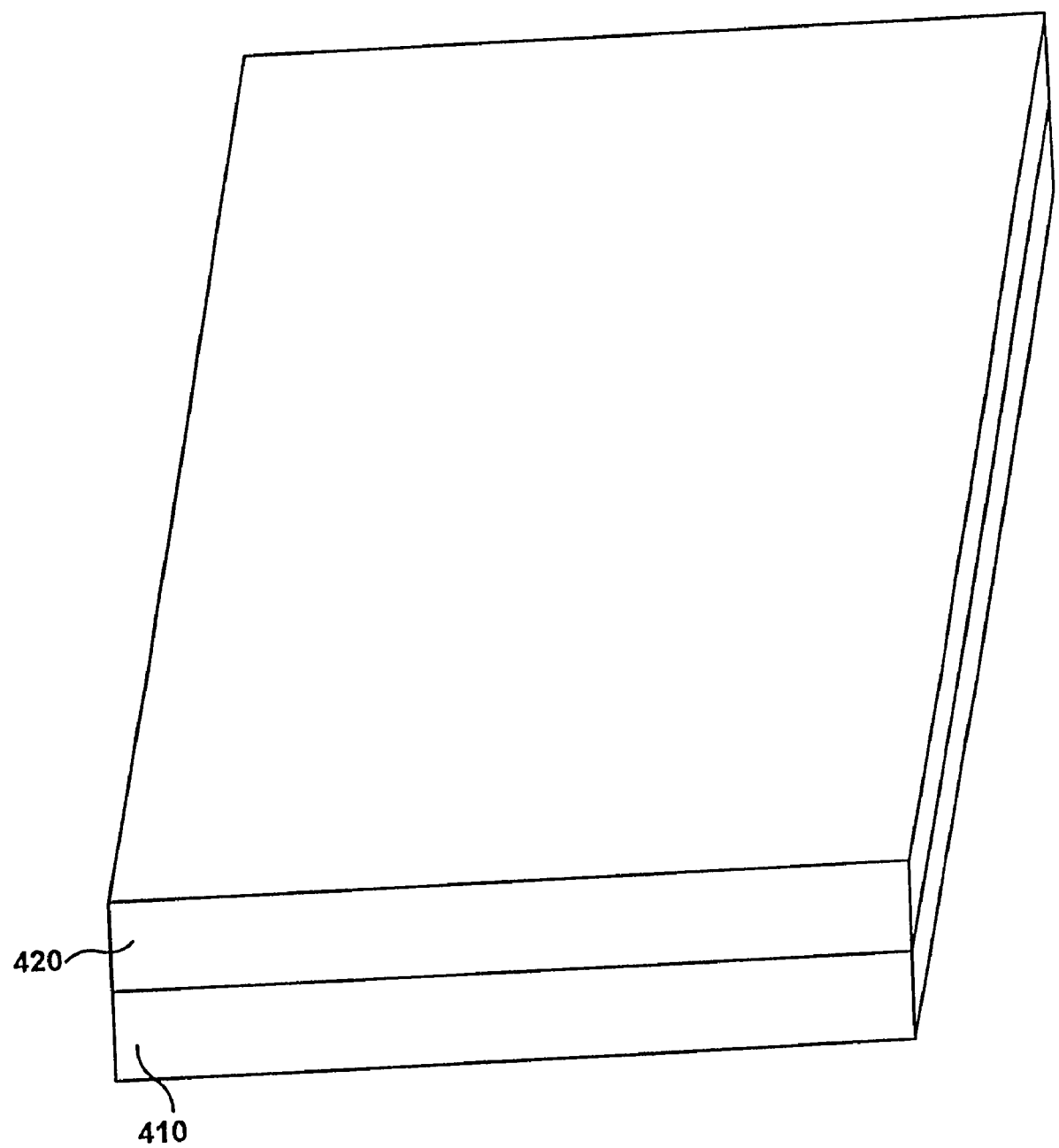
FIG. 4B is an illustration of an additional layer disposed upon the substrate of FIG. 4A, prior to patterning, heat treating, and etching being performed thereon, in one embodiment of the present invention.

FIG. 4B is an illustration of substrate 410 of FIG. 4A with an additional layer of glass, glass 420, bonded thereto. In one embodiment, diffusion bonding is utilized to bond glass 420 to substrate 410. In another embodiment, thin film sealing glass is utilized to bond glass 420 to substrate 410. In one embodiment, glass 420 is a photochemically sensitive glass, e.g., Fotoform or ceram, which has a thickness of thirty-five to seventy-five micrometers. It is appreciated that glass 420 is bonded to substrate 410 prior to patterning, heat treating, and etching being performed upon glass 420. In one embodiment, a black thin film, e.g., $CrO_3$, is deposited upon the bonding side of glass 420 prior to deposition and bonding upon substrate 410. In other embodiments, black matrix, DAG, and other similar processes can be implemented for the blackening of the bonding side of glass 420.

Figure 4C:
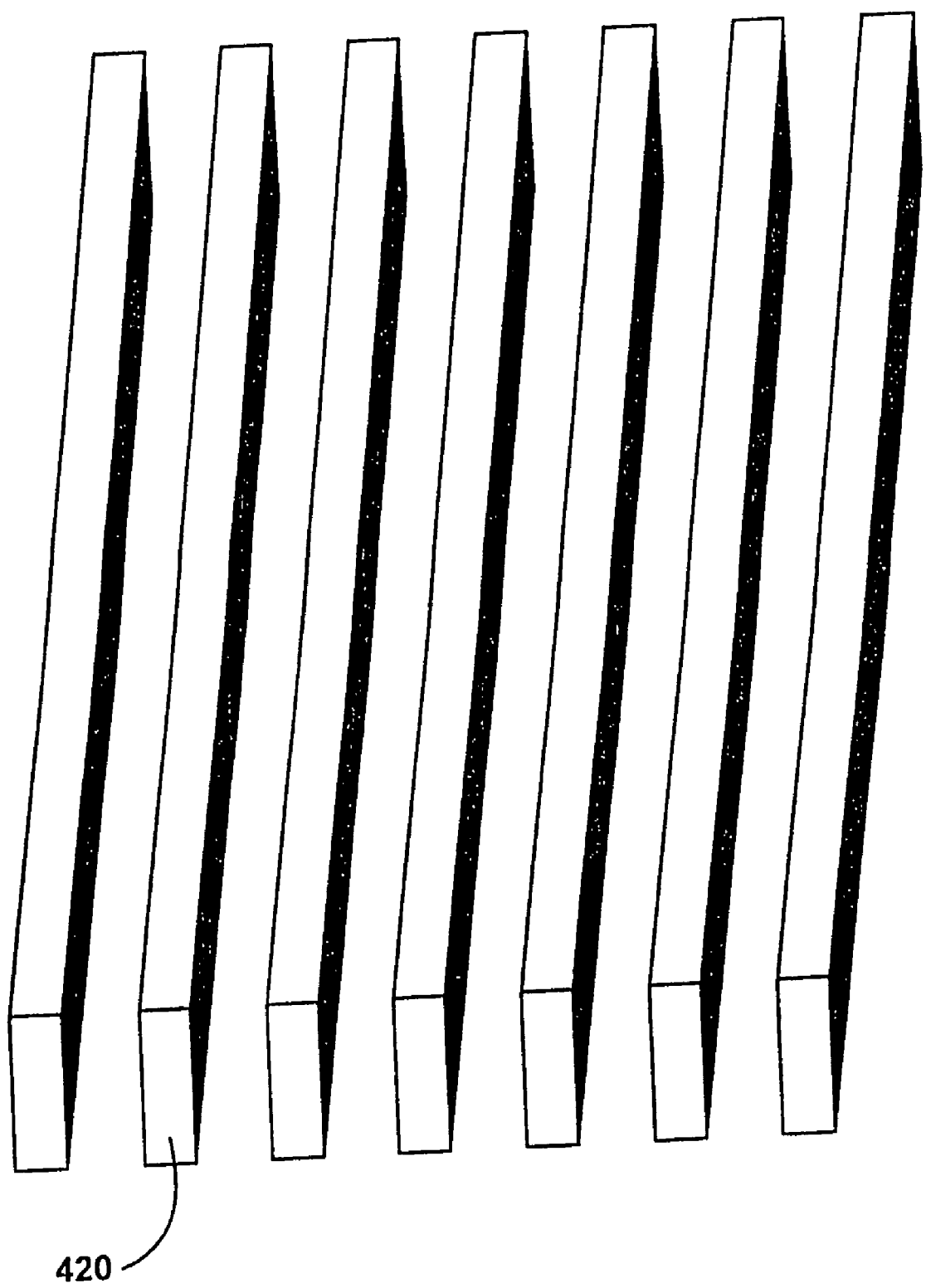
FIG. 4C is an illustration of an additional layer, prior to being disposed upon the substrate of FIG. 4A, upon which patterning, heat treating, and etching has been performed, in one embodiment of the present invention.

FIG. 4C is an illustration of additional layer of glass, glass 420 patterned, heat treated, and etched prior to bonding to substrate 410, in one embodiment of the present invention. In this embodiment, glass 420 is adapted to be bonded to substrate 410. It is appreciated that blackening of the bonding side of glass 420 is performed analogously to the blackening of glass 420 as described in FIG. 4B. It is further appreciated that the process of bonding glass 420 to substrate 410, such as that result as shown in FIG. 4D, is analogous to the bonding described in FIG. 4B.

Figure 4D:
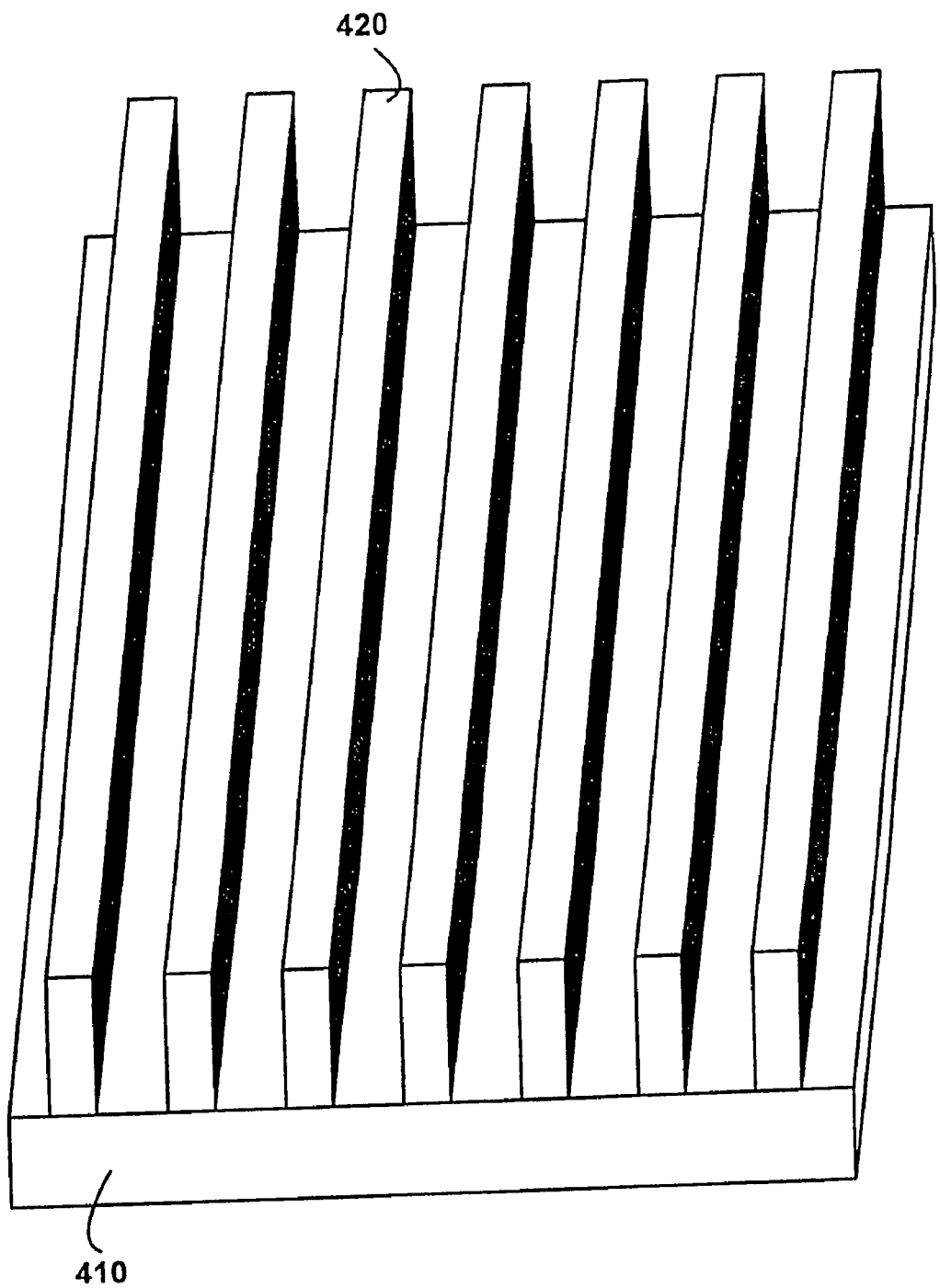
FIG. 4D is an illustration of the resulting additional layer subsequent to patterning, heat treating, and etching performed thereon, in one embodiment of the present invention.

FIG. 4D illustrates, in one example, the result of patterning, heat treating, and etching of glass 420, subsequent to bonding to substrate 410 as described in FIG. 4B. FIG. 4D, in another example, also illustrates glass 420, subsequent to patterning, heat treating, and etching performed thereon, having been bonded to substrate 410, in accordance with bonding processes as described in FIG. 4B.

Figure 4E:
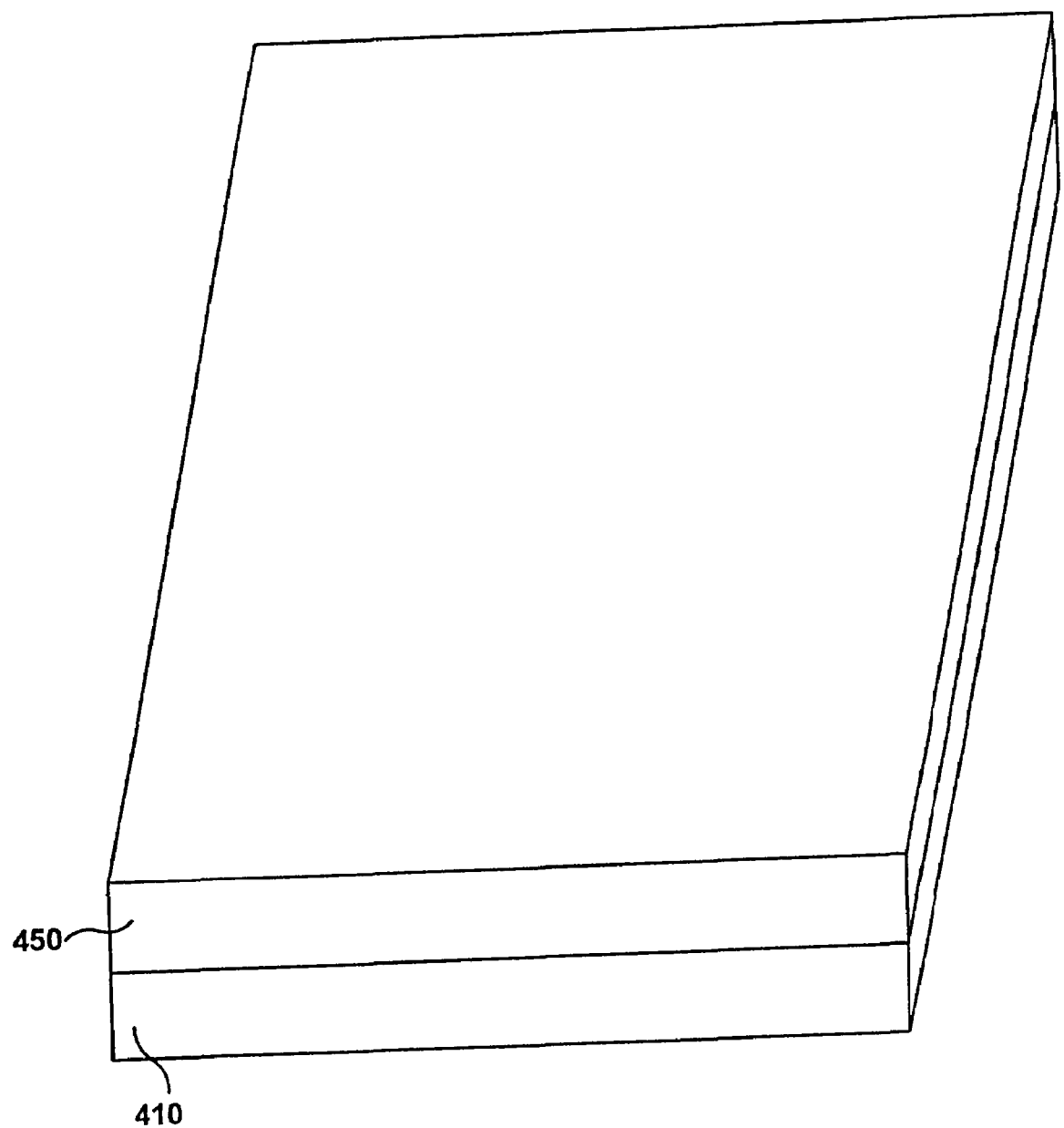
FIG. 4E is an illustration of the substrate of FIG. 4A configured with two portions, each having different physical properties, in one embodiment of the present invention.

FIG. 4E illustrates another embodiment of the present invention, wherein substrate 410 has been treated such that substrate 410 is comprised of two portions of the same glass, e.g., D263 glass. In this embodiment, lower portion 410 is analogous to substrate FIG. 4A, and upper portion 450 has had performed thereon a diffusing in of doping elements, so as to be made photochemically sensitive, and therefore responsive to patterning, heat treating, and etching.

Figure 4F:
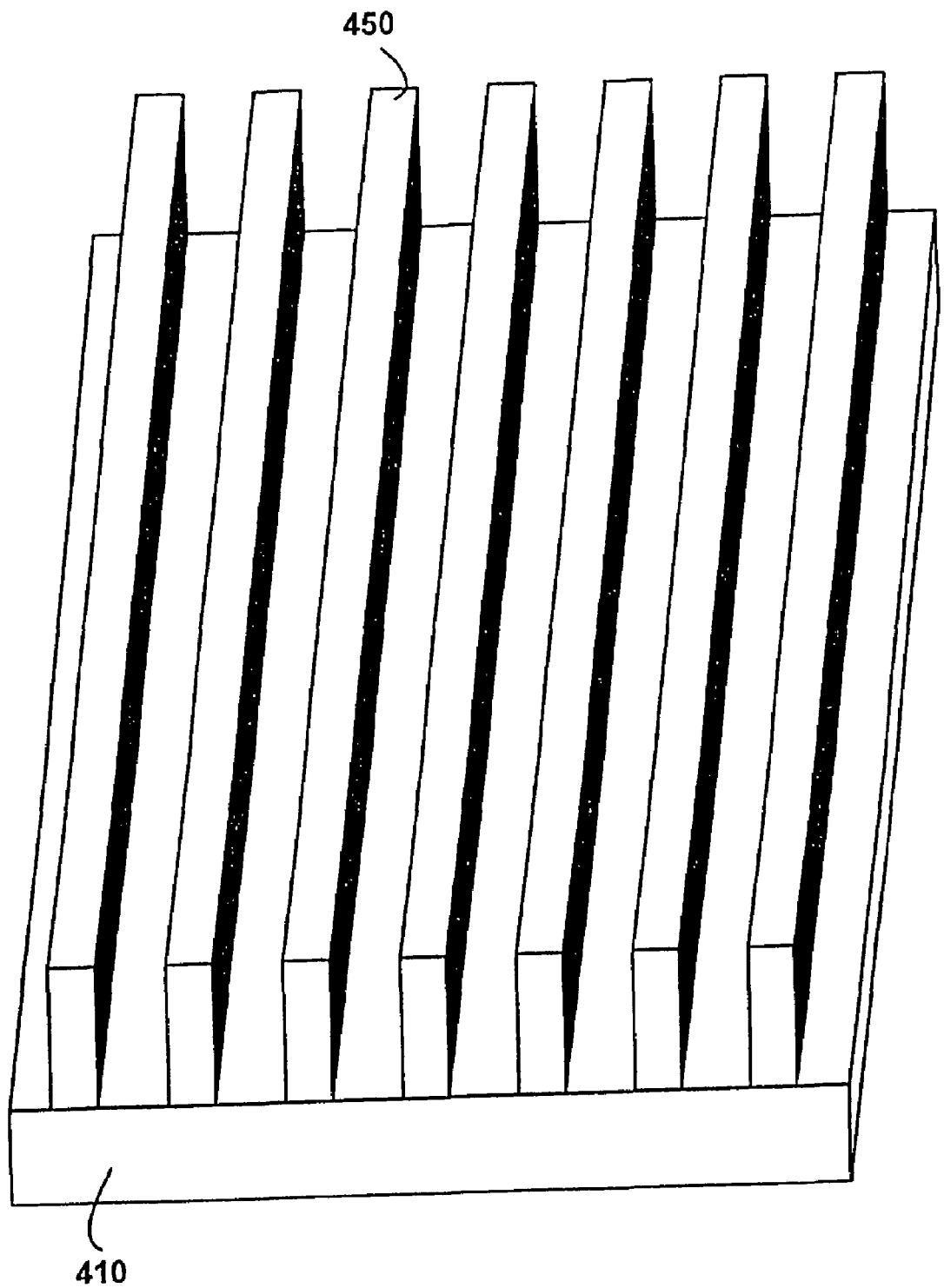
FIG. 4F is an illustration of the two portioned substrate of FIG. 4E, subsequent to etching of the top portion, in one embodiment of the present invention.

FIG. 4F illustrates the result of patterning, heat treating, and etching being performed upon upper portion 450, such that support structures are formed, and wherein FIG. 4F is, in dimension and function, analogous to that which is shown in FIG. 4D, in one embodiment of the present invention.

Figure 4G:
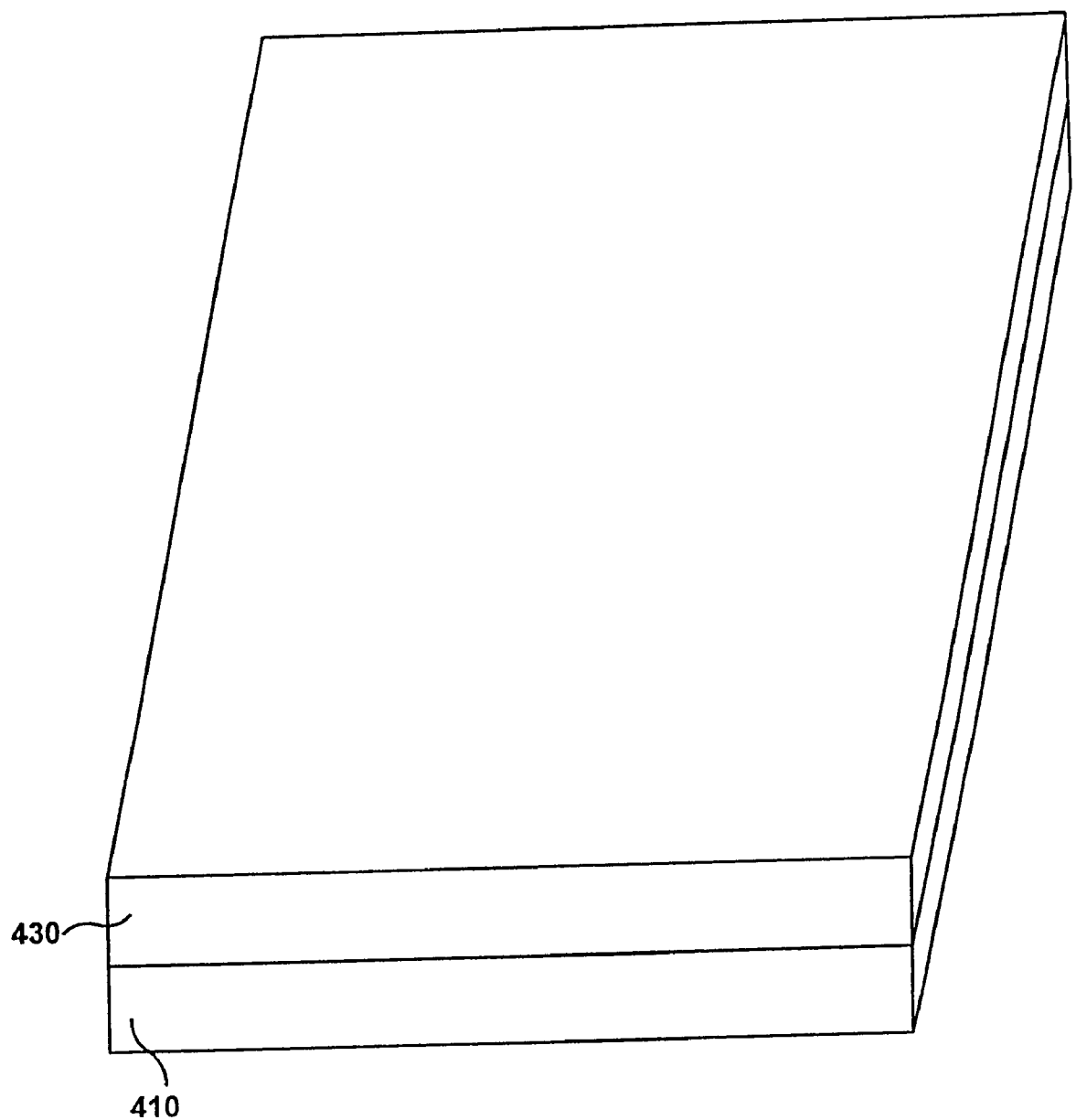
FIG. 4G is an illustration of a substrate having a ceramic material disposed thereon, in one embodiment of the present invention.

In another method of fabricating a support structure, sandblasting is implemented to fabricate the support structures. FIG. 4G shows substrate 410, analogous to substrate 410 of FIG. 4A, has received a screen printing of ceramic material 430 such that ceramic material 430 is disposed on substrate 410. In one embodiment, ceramic material 430 is comprised of a frit material which is fired at moderate temperatures, e.g., four hundred and fifty to six hundred degrees Celsius.

Figure 4H:
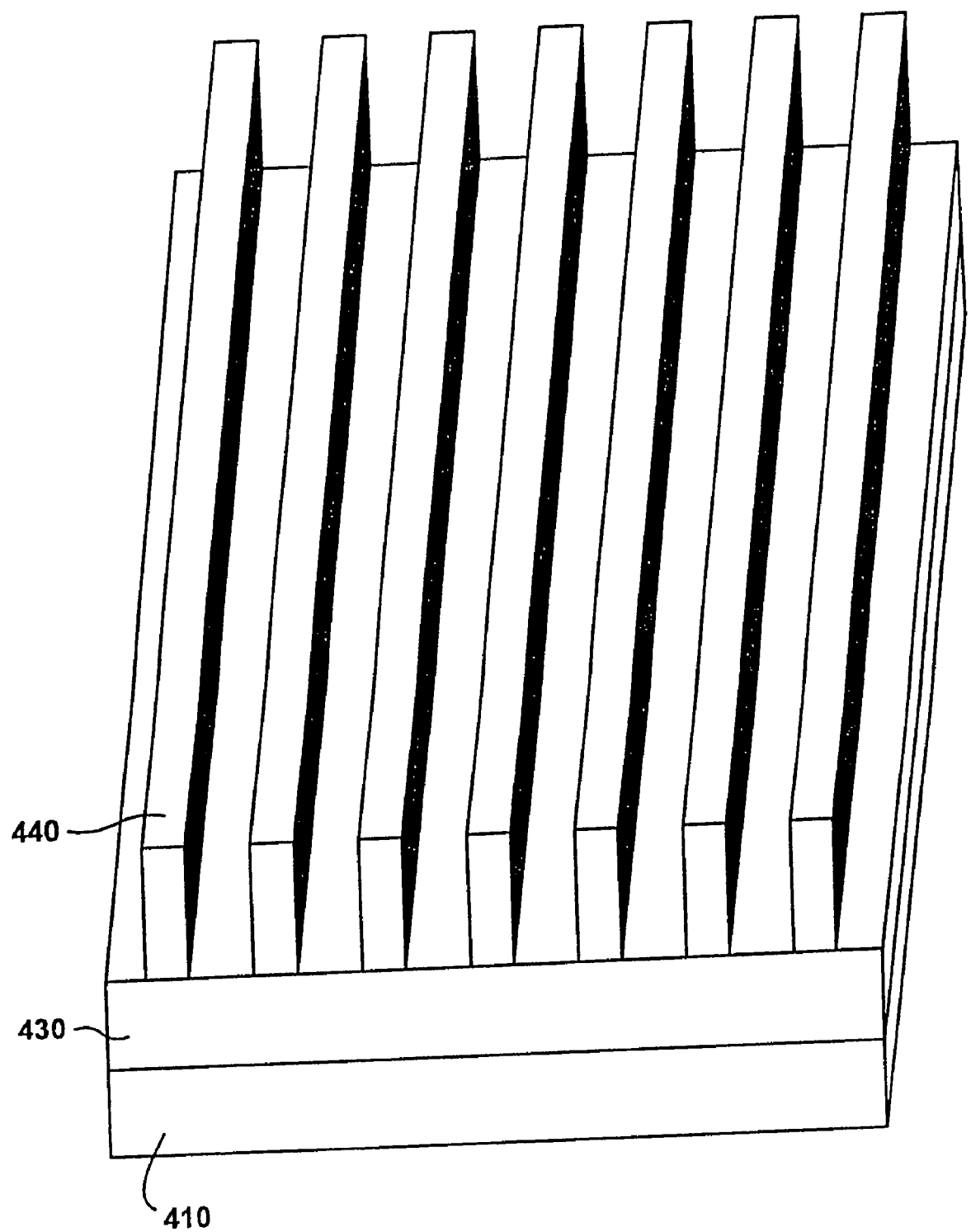
FIG. 4H is an illustration of the substrate and ceramic material of FIG. 4G having a photoresist layer disposed thereon.

Subsequent to the disposition of ceramic material 430, via screen printing, onto substrate 410, in one embodiment, a photoresist layer 440 is deposited upon ceramic material 430, as shown in FIG. 4H. In one embodiment, once photoresist layer 440 is deposited, it is exposed to the pattern of the support structure. In one embodiment, once photoresist layer 440 has been exposed to the pattern of the support structure, photoresist layer 440 is then developed.

Still referring to FIG. 4H, subsequent to the developing of photoresist layer 440, sandblasting by a sandblasting jet is applied thereto for the removal of all areas of ceramic material 430 not covered by photoresist 440, in one embodiment of the present invention.

Figure 4J:
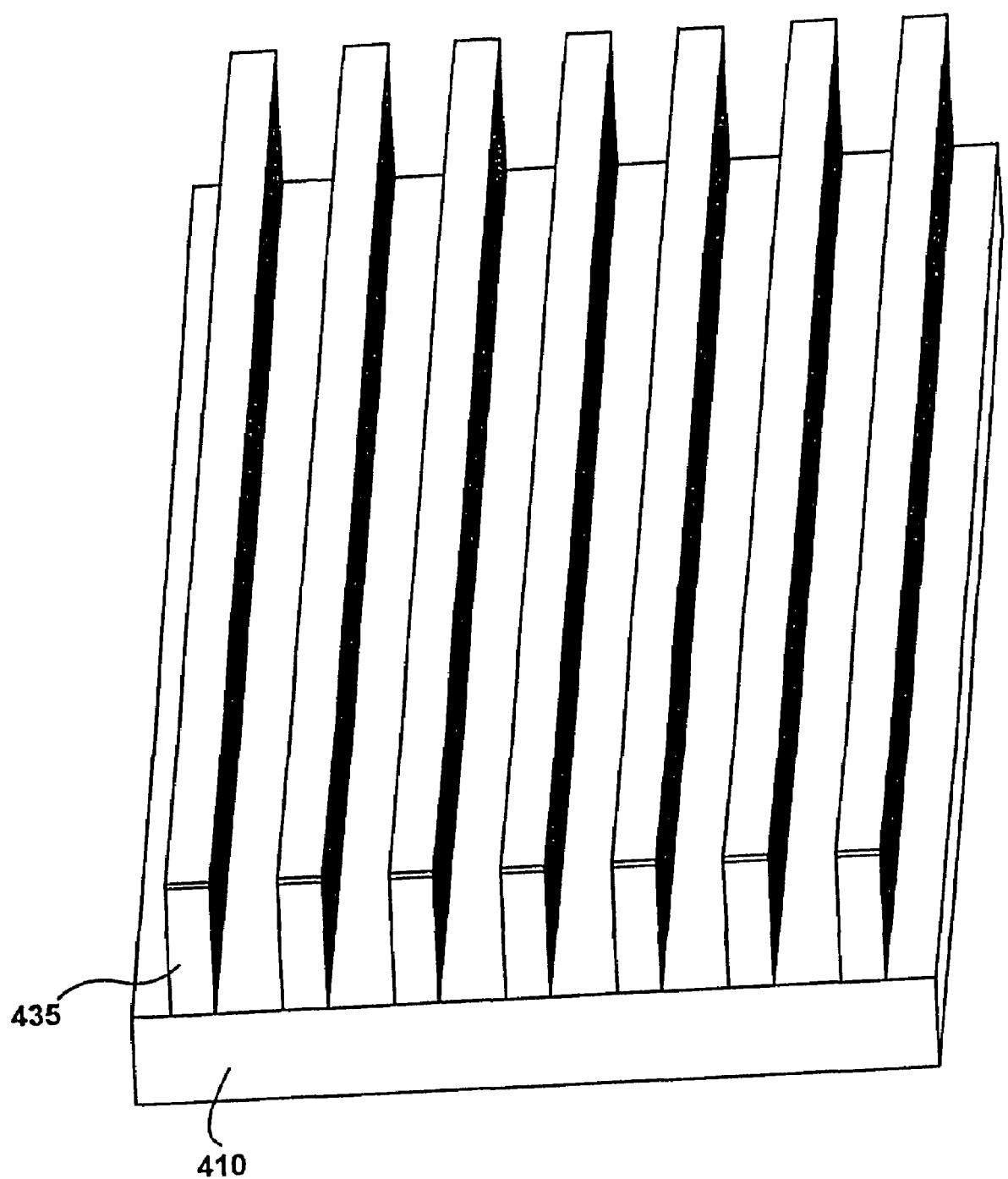
FIG. 4J is an illustration of FIG. 4H subsequent to an etching process performed thereon, in one embodiment of the present invention.

FIG. 4J is a sequential illustration of FIG. 4H, subsequent to sandblasting applied to those areas of ceramic material 430 not covered by photoresist layer 440, in one embodiment of the present invention. The resulting support structures, support structures 435 are shown in FIG. 4J.

In one embodiment of the present invention, ceramic material 430 is comprised of two materials, a first material (a binder) which is soft and easily etchable, and a second material (a filler) which is a hard or inert material. The etching process, initiated, then, in one embodiment, physically attacks, and in another embodiment, chemically attacks the soft binder material such that the hard filler particles are loosened and are subsequently easily physically removed, in one embodiment, and easily chemically washed away, in another embodiment.

In one embodiment, if the chemical wash is a direction wash, e.g., a liquid jet, then those loosened hard filler materials exposed to the liquid jet will be carried away. It is appreciated that undercutting of ceramic material 430 is minimized, in part, by the fact that photoresist layer 440 protects ceramic material 430 from the force of the liquid jet. This etch process is faster than previous methods because etching and/or eroding the hard filler material is not required, as the hard filler material is simply removed by the fluid of the liquid jet.

In another embodiment, an easily erodible material comprising a thick porous film can be used as a support structure disposed on substrate 410. In the present embodiment, the pore membranes are attacked by the liquid jet. The etch is rapid due to the low density of the easily erodible material. The directional nature of the liquid jet ensures anisotropy of the etch. It is appreciated that this etch process is selective because of the density difference in the support structure material and substrate 410 upon which it is disposed.

In another method of etching ceramic material 430, frozen submicron particles of $CO_2$, produced as an aerosol, are utilized as an abrasive etch, in one embodiment of the present invention. It is appreciated that the frozen $CO_2$ is not a hard as sand, and as such it will usually attack softer materials, e.g., plastics, soft metals (Ag, Cu, Sn). When such soft materials are present in filler material of the support structures being fabricated, these softer materials will be preferentially etched, in one embodiment. It is noted that the $CO_2$ spray will have enough pressure to carry away loosened particles of the filler material. It is further noted that $CO_2$ particles are not hard enough to etch substrate 410, such that an excellent etch stop is ensured. It is also noted that the $CO_2$ will sublime after heating, such that only residues from the filler material loosened from substrate 410 will be present.

In yet another method of etching ceramic material 410, a chemical is used to attack the binder material but not otherwise attack the filler material, in one embodiment of the present invention. In this method of etching, the chemical is designed not to attack substrate 410. In one embodiment, the etch is applied as a high pressure jet, such that filler particles, which are loosened, can be readily carried away.

In one embodiment of the present invention, it is appreciated that the fabrication of a black matrix, e.g., black matrix 124 of FIG. 1, and the fabrication of an aluminum layer, e.g., aluminum layer 122 of FIG. 1, is performed in conjunction with the fabrication of the support structures as described in FIGS. 4A to 4J.

Figure 5A:
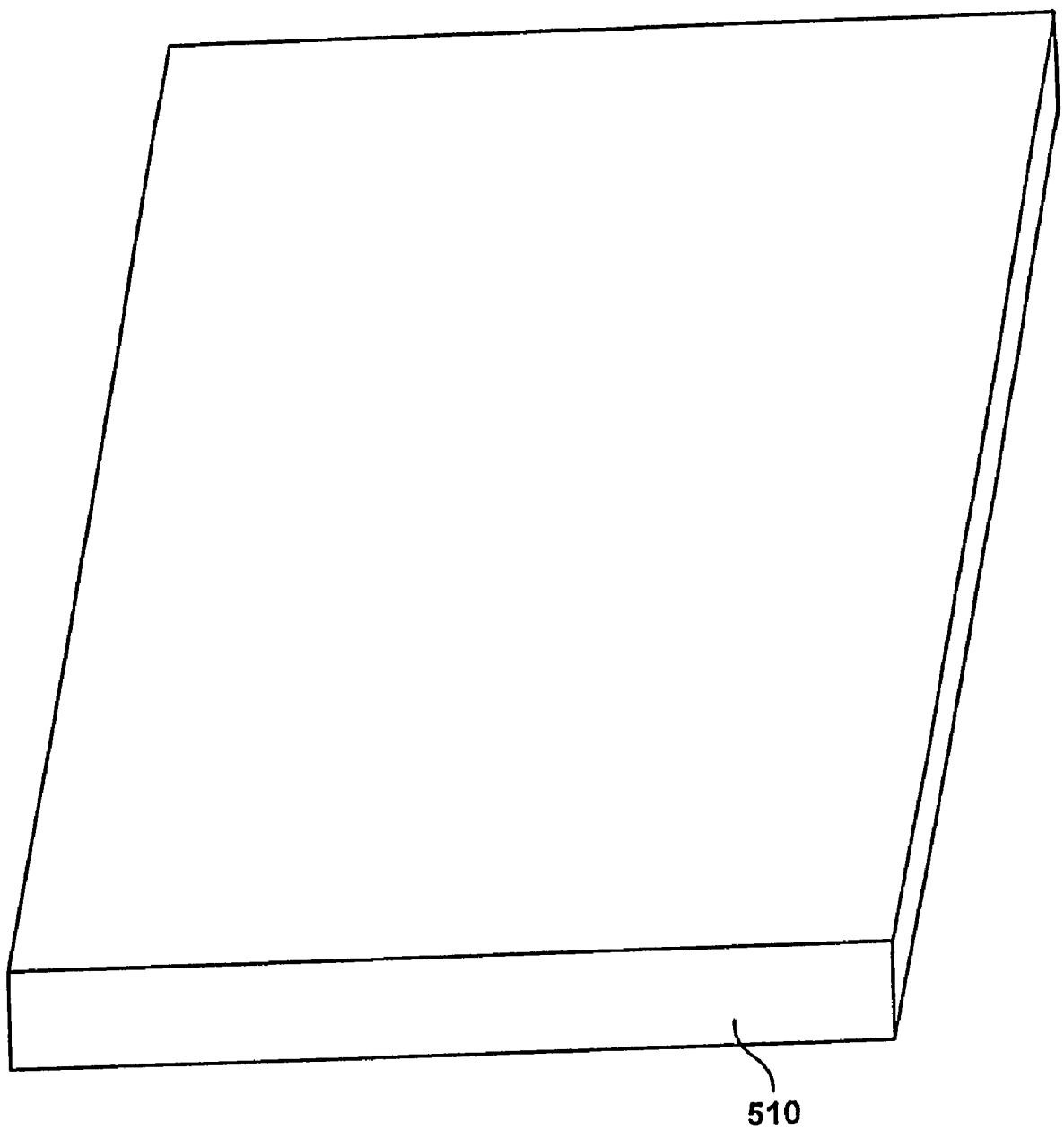
FIG. 5A is an illustration of the substrate of FIG. 2A upon which further embodiments of the present invention may be practiced.

In another method to fabricate support structures, metal foil, in a continuous or sheet form, is utilized in the fabrication process. FIG. 5A is an illustration of substrate 510 upon which embodiments of the present invention may be practiced. Substrate 510 is analogous to substrate 210 of FIG. 2A. In one embodiment, substrate 510 is D263 glass. In another embodiment, substrate 510 is an alternative glass.

Figure 5B:
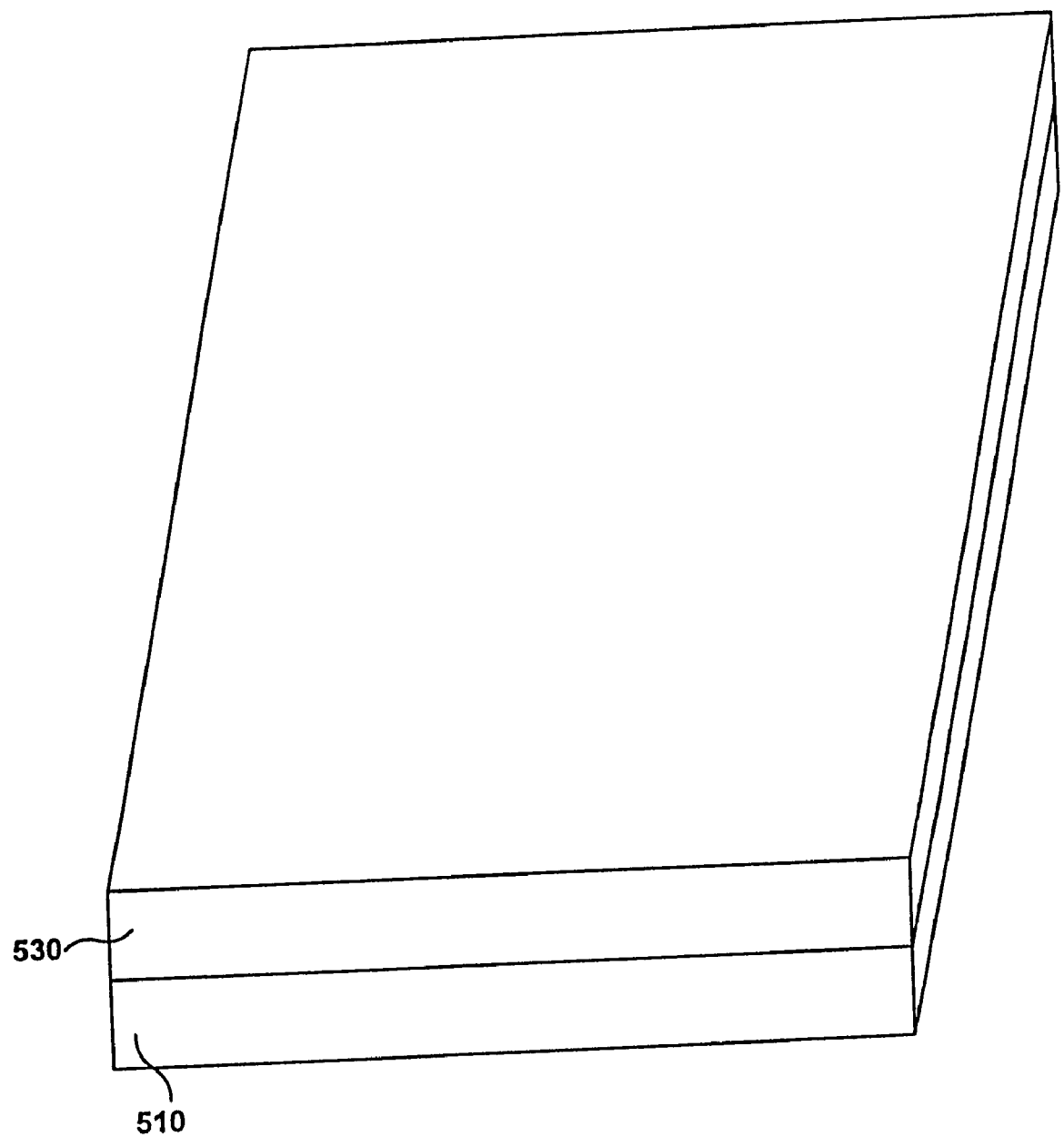
FIG. 5B is an illustration of an additional layer disposed upon the substrate of FIG. 5A, prior to patterning, heat treating, and etching being performed thereon, in one embodiment of the present invention.

FIG. 5B is an illustration of substrate 510 of FIG. 5A with an additional layer of metal foil, metal foil 530, attached thereto. In one embodiment, diffusion bonding is utilized to attach metal foil 530 to substrate 510. In another embodiment, thin film sealing glass is utilized to attach metal foil 530 to substrate 510. In another embodiment, anodic bonding is utilized to attach metal foil 530 to substrate 510. In one embodiment, metal foil 530 is a CTE (coefficient of thermal expansion) matched foil, e.g., Ni/Fe alloy, Ni/Fe/Co alloy, Nb, Mo, Titanium, Zirconium, and the like, and which has a thickness ranging from twenty five to fifty micrometers. It is appreciated that, in one embodiment, metal foil 530 is bonded to substrate 510 prior to patterning, heat treating, and etching being performed upon metal foil 530. In one embodiment, $CrO_3$ is deposited upon the bonding side of metal foil 530 prior to deposition and bonding upon substrate 530. $CrO_3$ is for the blackening of the bonding side of metal foil 530.

Figure 5C:
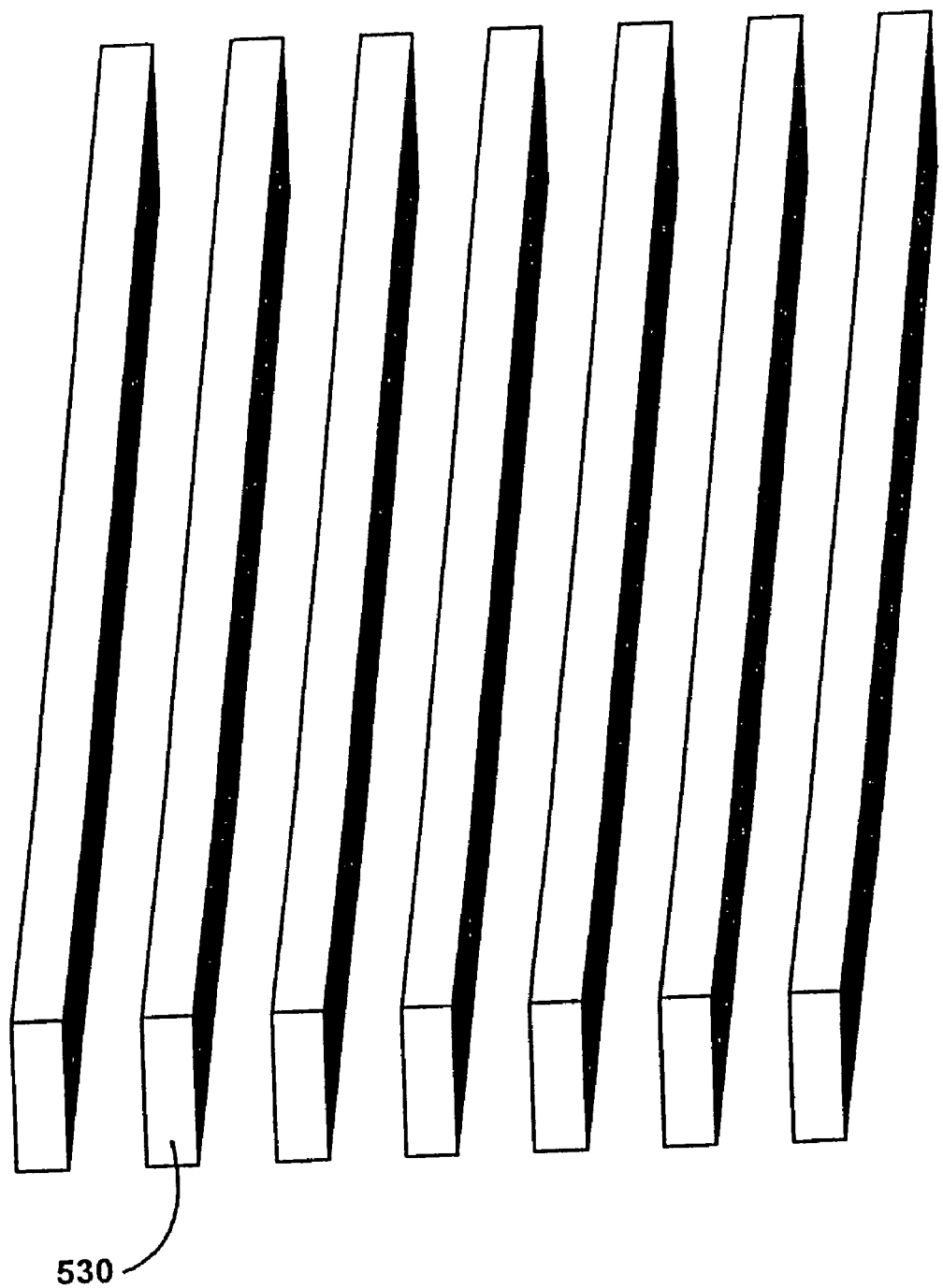
FIG. 5C is an illustration of an additional layer, prior to being disposed upon the substrate of FIG. 4A, upon which patterning, heat treating, and etching has been performed, in one embodiment of the present invention.

FIG. 5C is an illustration of metal foil 530 patterned, heat treated, and etched prior to bonding to substrate 510, in one embodiment of the present invention. In this embodiment, metal foil 530 is adapted to be bonded to substrate 510. It is appreciated that blackening of the bonding side of metal foil 530 is performed analogously to the blackening of metal foil 530 as described in FIG. 5B. It is further appreciated that the process of bonding metal foil 530 to substrate 510, such as the result as shown in FIG. 5D, is analogous to the bonding described in FIG. 5B.

Figure 5D:
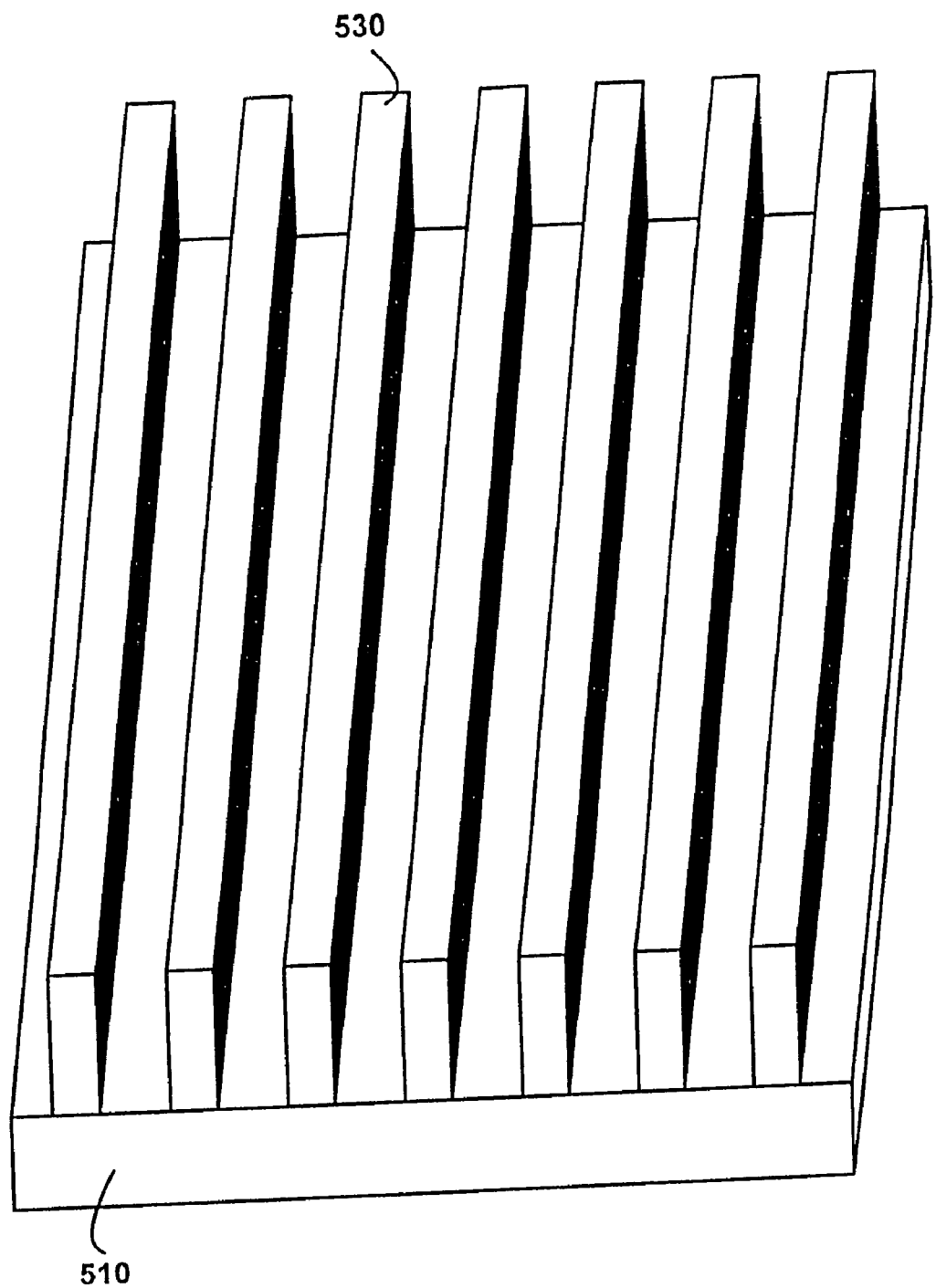
FIG. 5D is an illustration of the resulting additional layer subsequent to patterning, heat treating, and etching performed thereon, in one embodiment of the present invention.

FIG. 5D illustrates, in one example, the result of patterning, heat treating, and etching of metal foil 530, subsequent to bonding to substrate 510 as described in FIG. 5B. FIG. 5D, in anther example, also illustrates metal foil 530, subsequent to patterning, heat treating, and etching performed thereon, having been bonded to substrate 510, in accordance with bonding processes as described in FIG. 5B.

In one embodiment of the present invention, it is appreciated that the fabrication of a black matrix, e.g., black matrix 124 of FIG. 1, and the fabrication of an aluminum layer, e.g., aluminum layer 122 of FIG. 1, is performed in conjunction with the fabrication of the support structures as described in FIGS. 5A to 5D.

It is appreciated that in the present invention, a method of fabricating a support structure, the support structure being fabricated is described as having a rectangular shape, in other embodiments, the support structure can be other shapes, e.g., cylindrical, cross like, and the like. It is further appreciated that although the support structures are shown as a solid structure, in another embodiment, the support structures may be further comprised of voids or may be porous in nature.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of fabricating a support structure comprising:
   forming a layer of material into said support structure, said layer of material adapted to be attached onto a substrate surface;
   blackening a surface of said layer of material, such that said blackened surface of said layer of material is interposed between said layer of material and said substrate surface when said layer of material is attached onto said substrate surface;
   treating said layer of material; and
   etching said layer of material, such that said support structure is implementable during assembly of a display device, said etching including sandblasting said layer of material with frozen particles of carbon dioxide, such that said substrate surface is unaffected by said sandblasting when said layer of material is attached to said substrate surface prior to said etching, when said layer of material is photochemically insensitive glass.

2. The method as recited in claim 1 wherein said display device is a field emission display.

* * * * *